US010377318B1

(12) United States Patent
Recker

(10) Patent No.: US 10,377,318 B1
(45) Date of Patent: Aug. 13, 2019

(54) VEHICLE LIFT GATE ACCESSORY MOUNTING DEVICE

(71) Applicant: Reticle, LLC, Loveland, OH (US)

(72) Inventor: John A. Recker, Loveland, OH (US)

(73) Assignee: Reticle, LLC, Loveland, OH (US)

( * ) Notice: Subject to any disclaimer, the term of this patent is extended or adjusted under 35 U.S.C. 154(b) by 77 days.

(21) Appl. No.: 15/661,062

(22) Filed: Jul. 27, 2017

Related U.S. Application Data

(60) Provisional application No. 62/406,488, filed on Oct. 11, 2016.

(51) Int. Cl.

| | |
|---|---|
| ***A45B 11/00*** | (2006.01) |
| ***B60R 7/12*** | (2006.01) |
| ***E04H 15/06*** | (2006.01) |
| ***B60R 7/02*** | (2006.01) |
| *B60P 3/34* | (2006.01) |
| *B60R 11/00* | (2006.01) |
| *B60R 9/06* | (2006.01) |
| *B60R 9/10* | (2006.01) |

(52) U.S. Cl.

CPC ................ *B60R 7/12* (2013.01); *A45B 11/00* (2013.01); *B60R 7/02* (2013.01); *E04H 15/06* (2013.01); *B60P 3/343* (2013.01); *B60R 9/06* (2013.01); *B60R 9/10* (2013.01); *B60R 2011/0036* (2013.01); *B60R 2011/0071* (2013.01)

(58) Field of Classification Search

CPC .... B60R 9/06; B60R 9/10; B60R 7/12; B60R 7/02; B60R 2011/0036; B60R 2011/0071; A45B 11/00; E04H 15/06; B60P 3/343

USPC ............. 248/345, 534, 220.21, 224.7, 309.1; 224/314, 493

See application file for complete search history.

(56) References Cited

U.S. PATENT DOCUMENTS 2,483,478 A 10/1949 Smelker
2,626,165 A 1/1953 Snyder
3,841,544 A * 10/1974 Berger ...................... B60R 9/10 224/493
3,927,810 A * 12/1975 Danon ...................... B60R 9/06 224/314
4,124,240 A 11/1978 Adelberg
4,290,540 A * 9/1981 Allen ........................ B60R 9/10 224/314

(Continued)

FOREIGN PATENT DOCUMENTS

GB 2494779 * 3/2013

*Primary Examiner* — Tan Le

(74) *Attorney, Agent, or Firm* — Wood Herron & Evans LLP

(57) ABSTRACT

A support bracket attaches to a standard automobile trunk lid or hatch lift gate locking mechanism to hold a variety of accessory items including an umbrella above the head of a user. The bracket is adjusted and clamped in tightness to the lift gates locking mechanism whereas to secure it without movement to the trunk or hatch lid. It is released using the standard factory provided vehicle trunk or lift gate release mechanism. The device can be used independent of any hand support when the user is adjacent the open trunk or hatch of an automobile. Accessories are placed into a releasable engagement with the bracket sleeve, which may be separately adjusted relative to the main bracket assembly to position the accessory advantageously to the individual behind the vehicle. The umbrella accessory allows for an unobstructed shelter from precipitation and sun.

10 Claims, 24 Drawing Sheets

(56) References Cited

U.S. PATENT DOCUMENTS

| | | | | | |
|---|---|---|---|---|---|
| 4,394,948 | A * | 7/1983 | Graber | B60R 9/06 224/314 |
| 4,519,409 | A | 5/1985 | Kinney et al. | |
| 5,135,145 | A * | 8/1992 | Hannes | B60R 9/06 224/314 |
| 5,188,331 | A | 2/1993 | Baines | |
| 5,529,368 | A | 6/1996 | Cui et al. | |
| 6,286,738 | B1 * | 9/2001 | Robins | B60R 9/06 224/314 |
| 6,401,736 | B1 * | 6/2002 | Jerry | A45B 11/00 135/25.1 |
| 6,722,290 | B2 * | 4/2004 | Wetterlund | B60N 3/001 108/44 |
| 7,798,073 | B2 * | 9/2010 | Swailes | A47B 31/06 108/44 |
| 2003/0230329 | A1 * | 12/2003 | McGarty | E04H 15/06 135/88.07 |

* cited by examiner

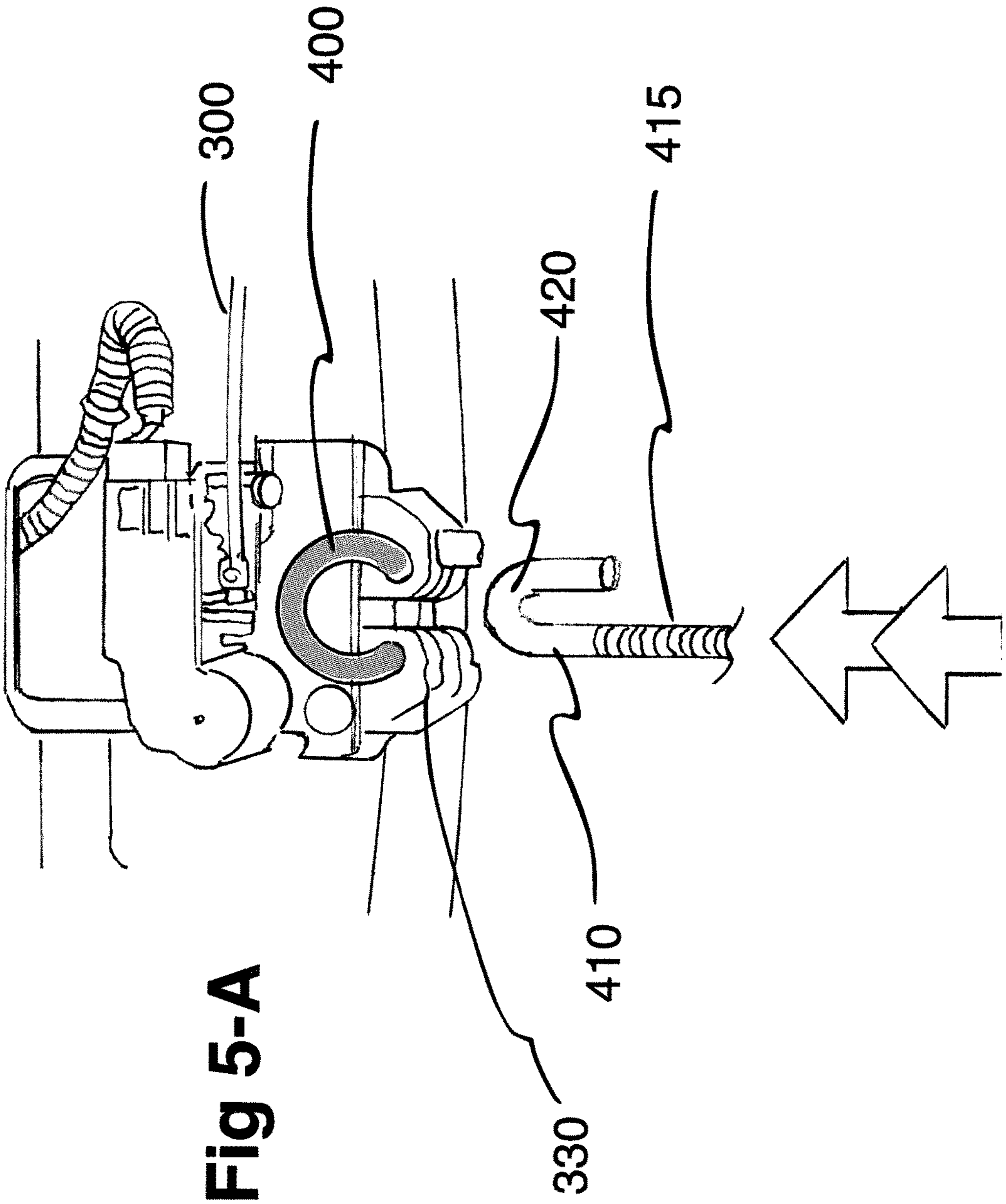
Fig 5-A

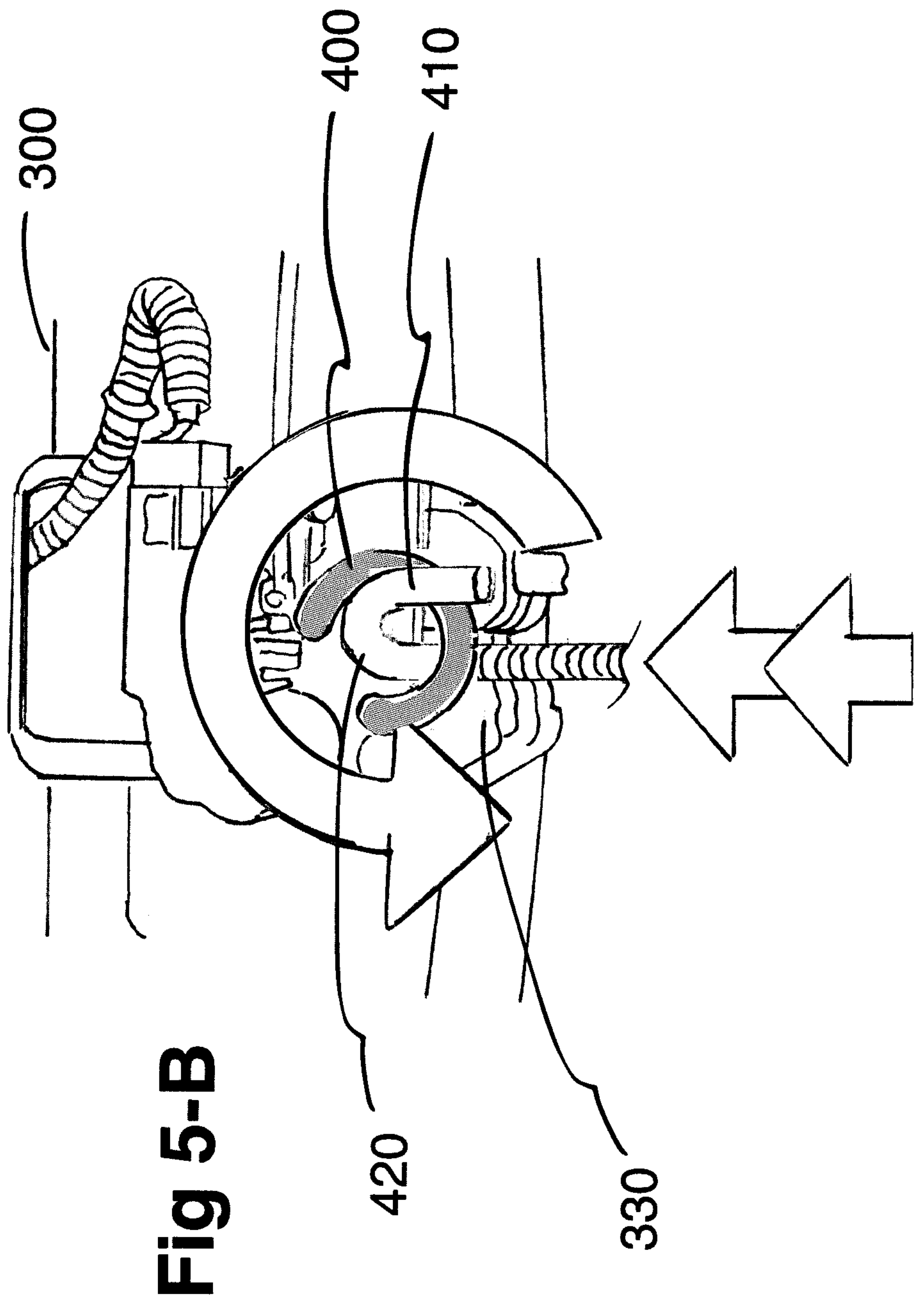
Fig 5-B

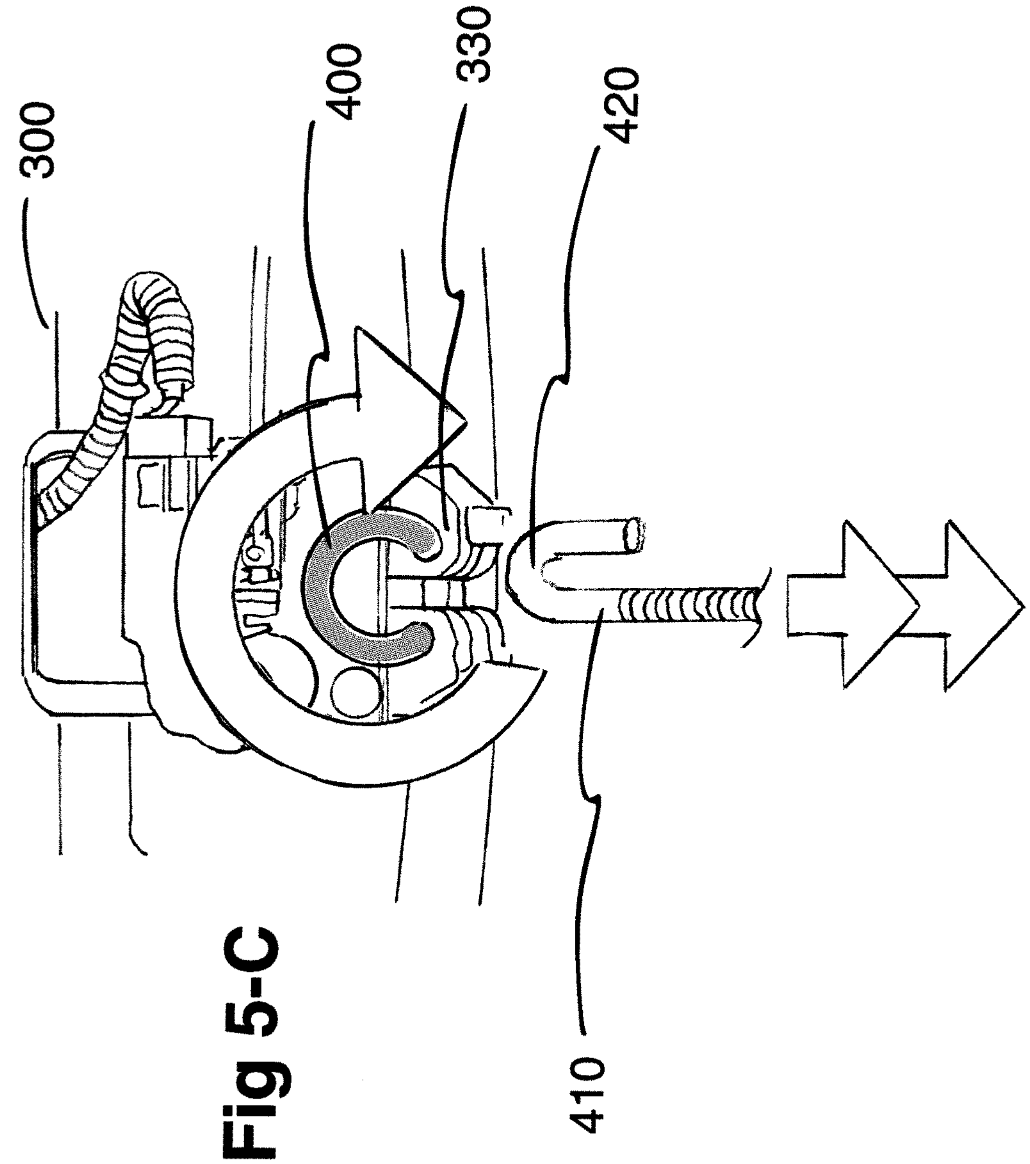
Fig 5-C

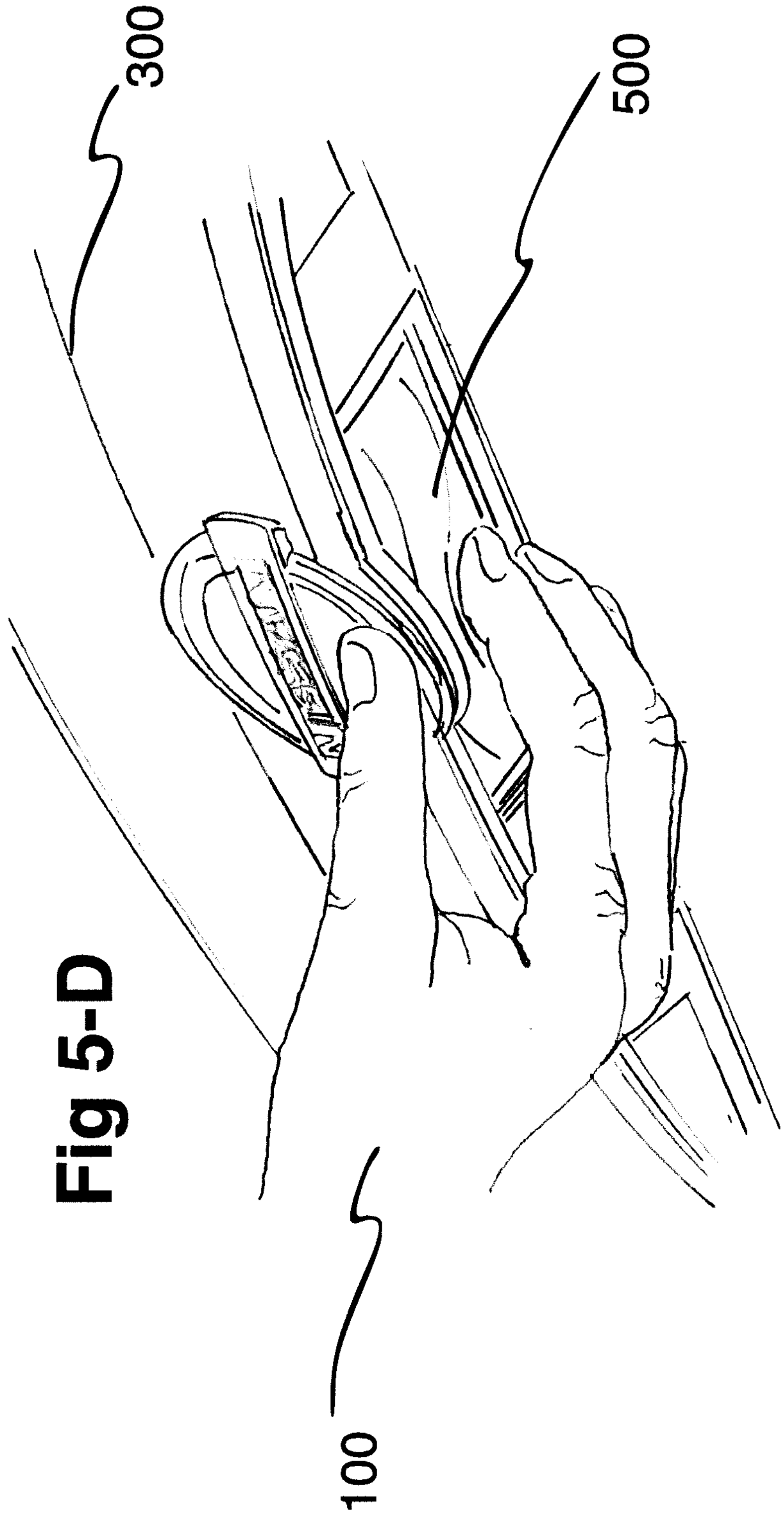
Fig 5-D

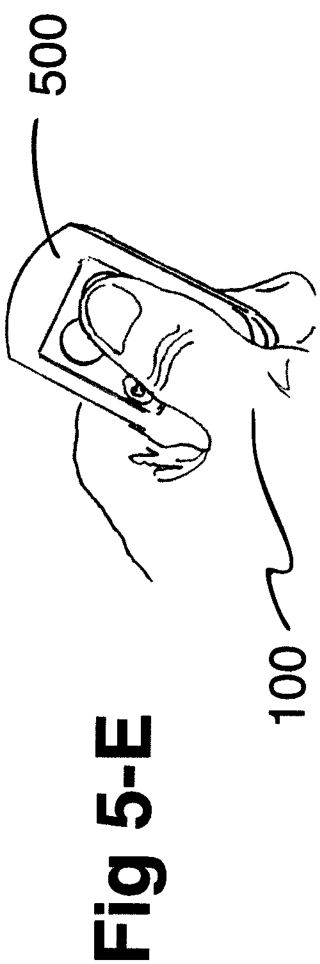
Fig 5-E
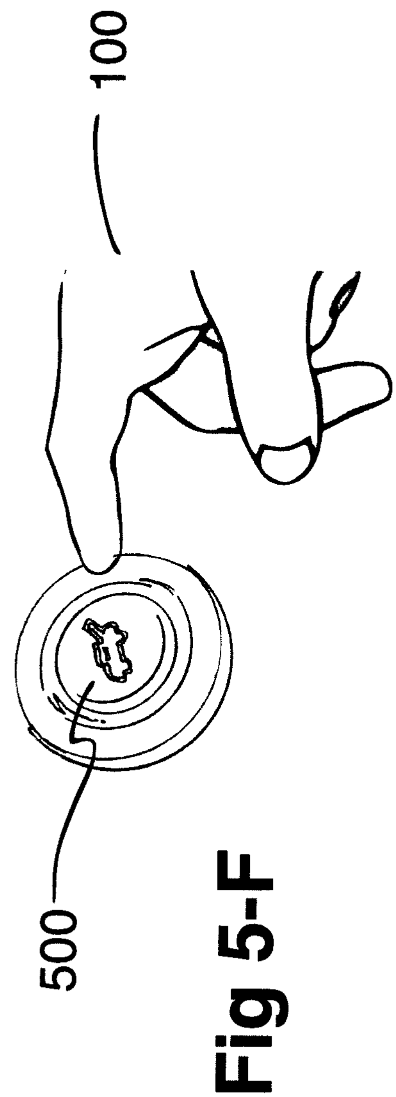
Fig 5-F

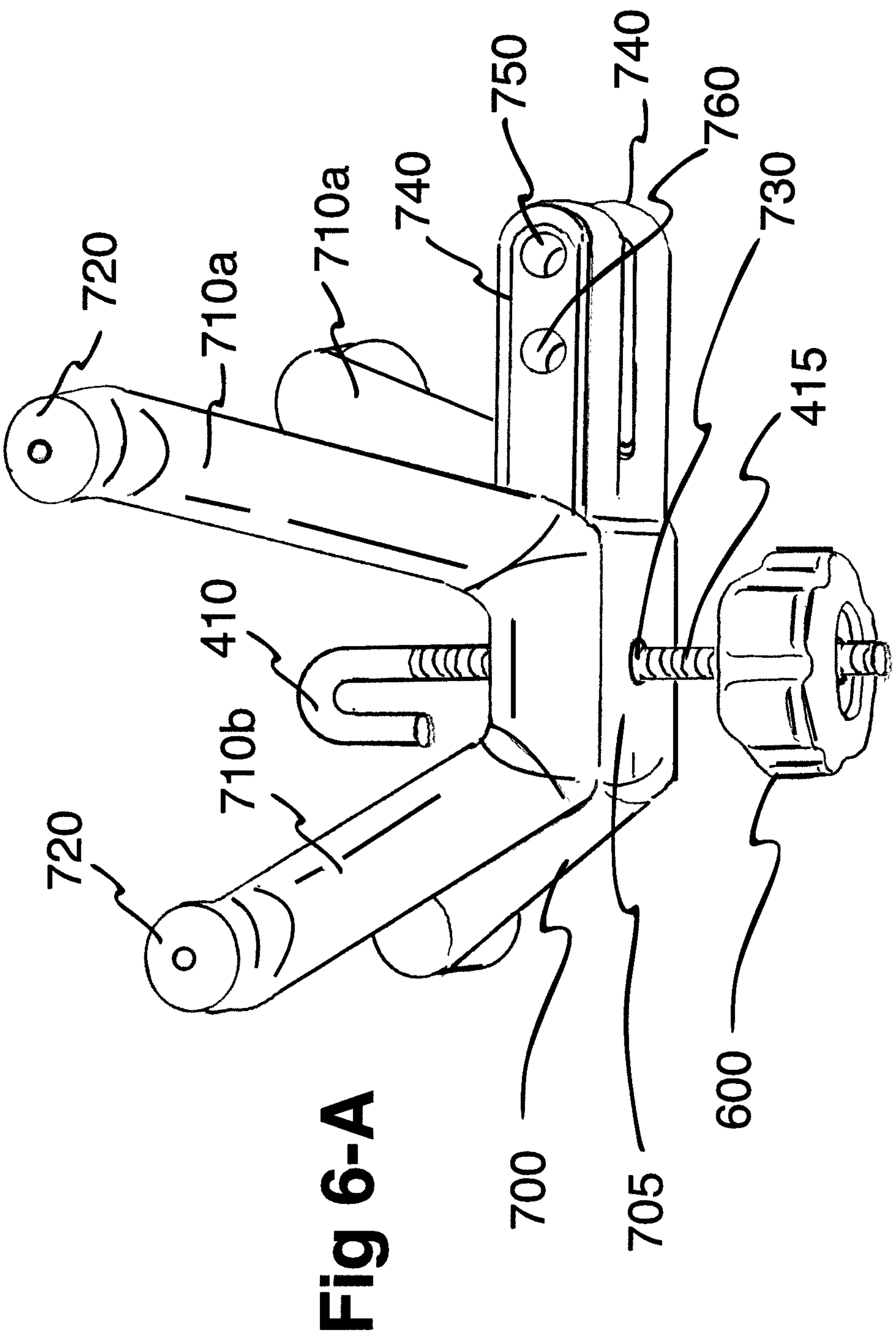
Fig 6-A

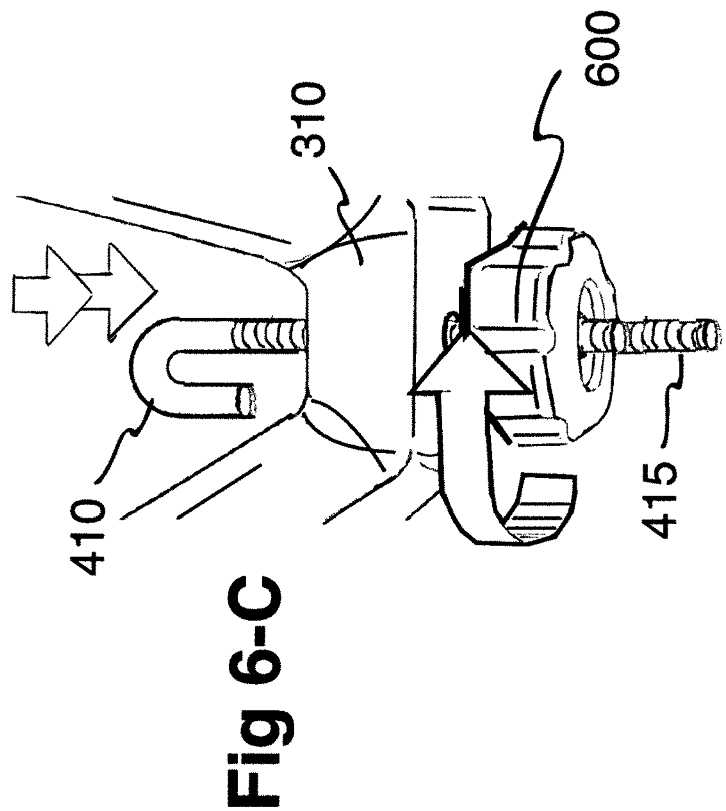
Fig 6-C
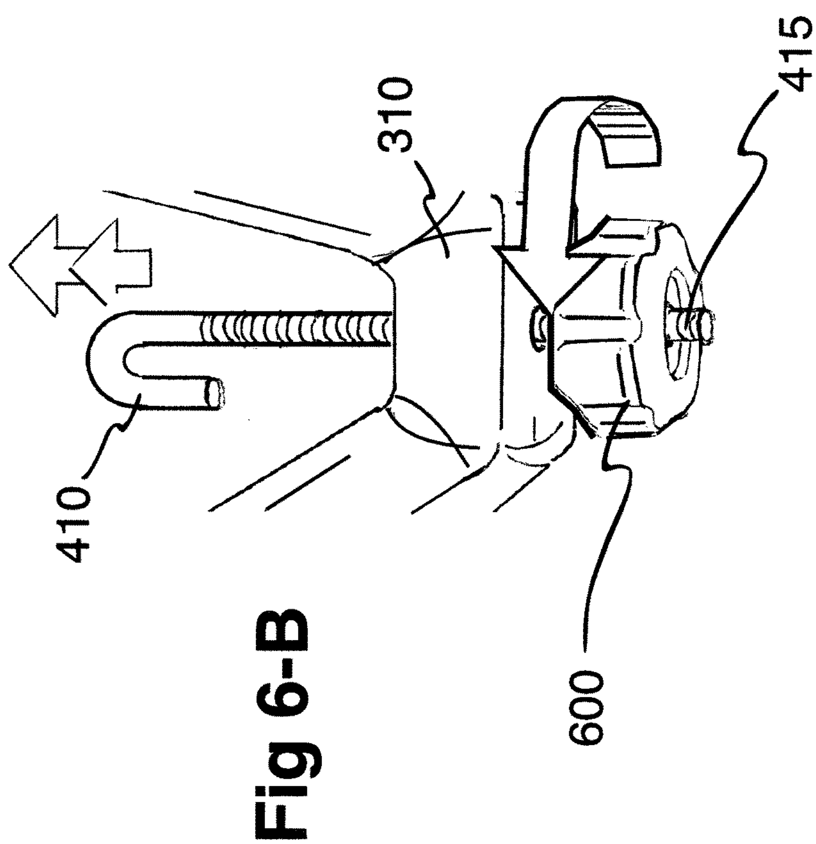
Fig 6-B

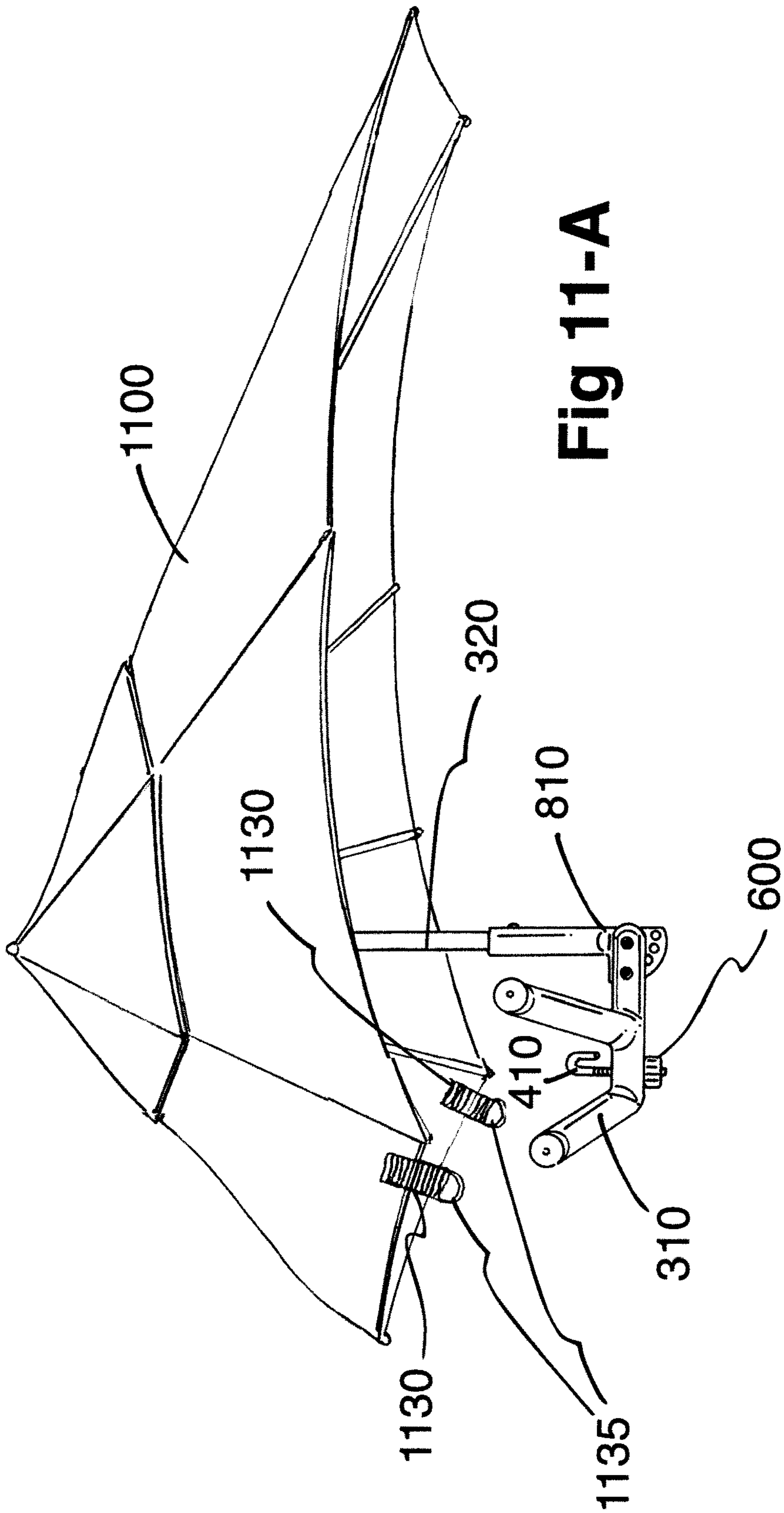
Fig 11-A

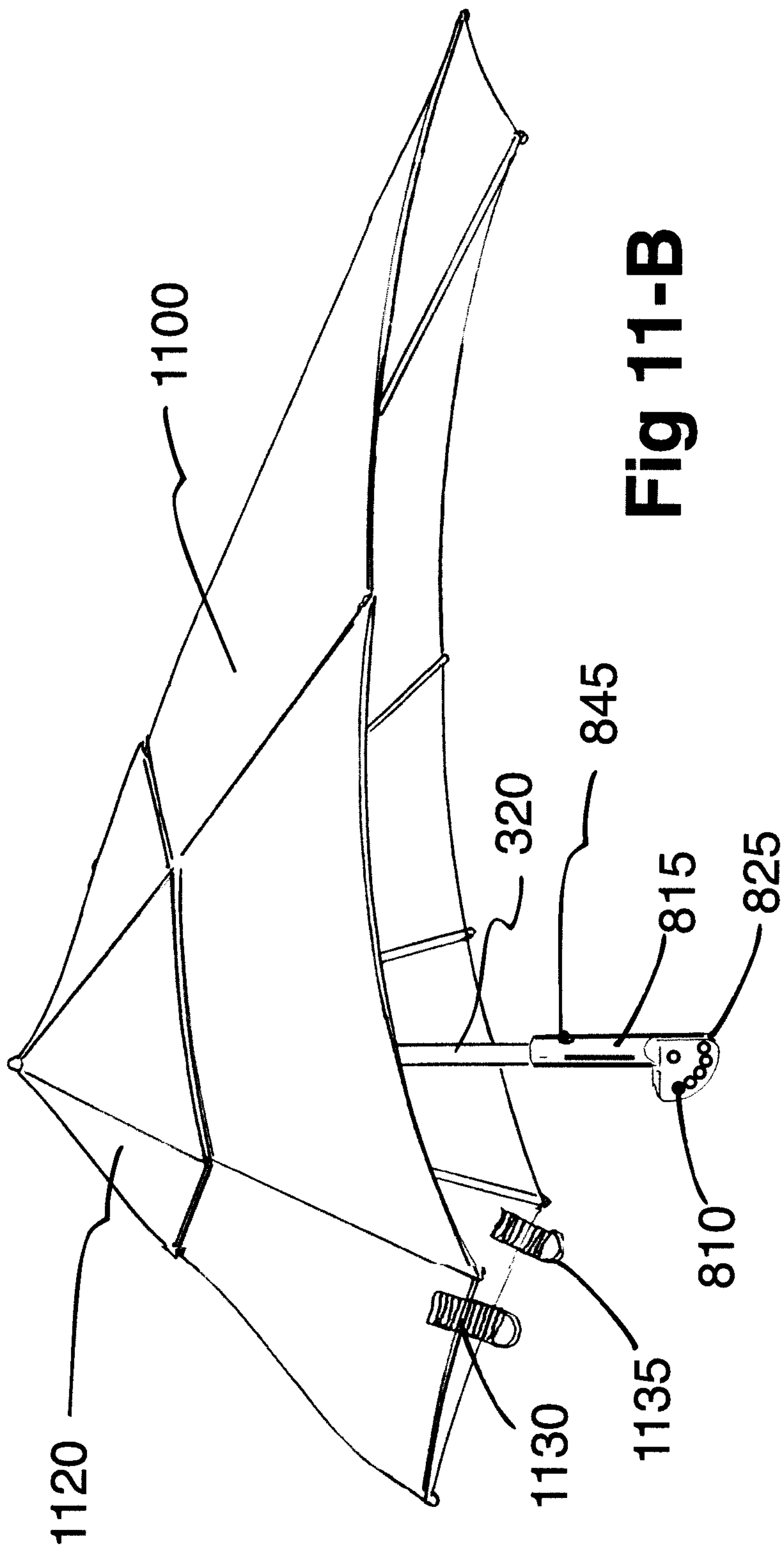
Fig 11-B

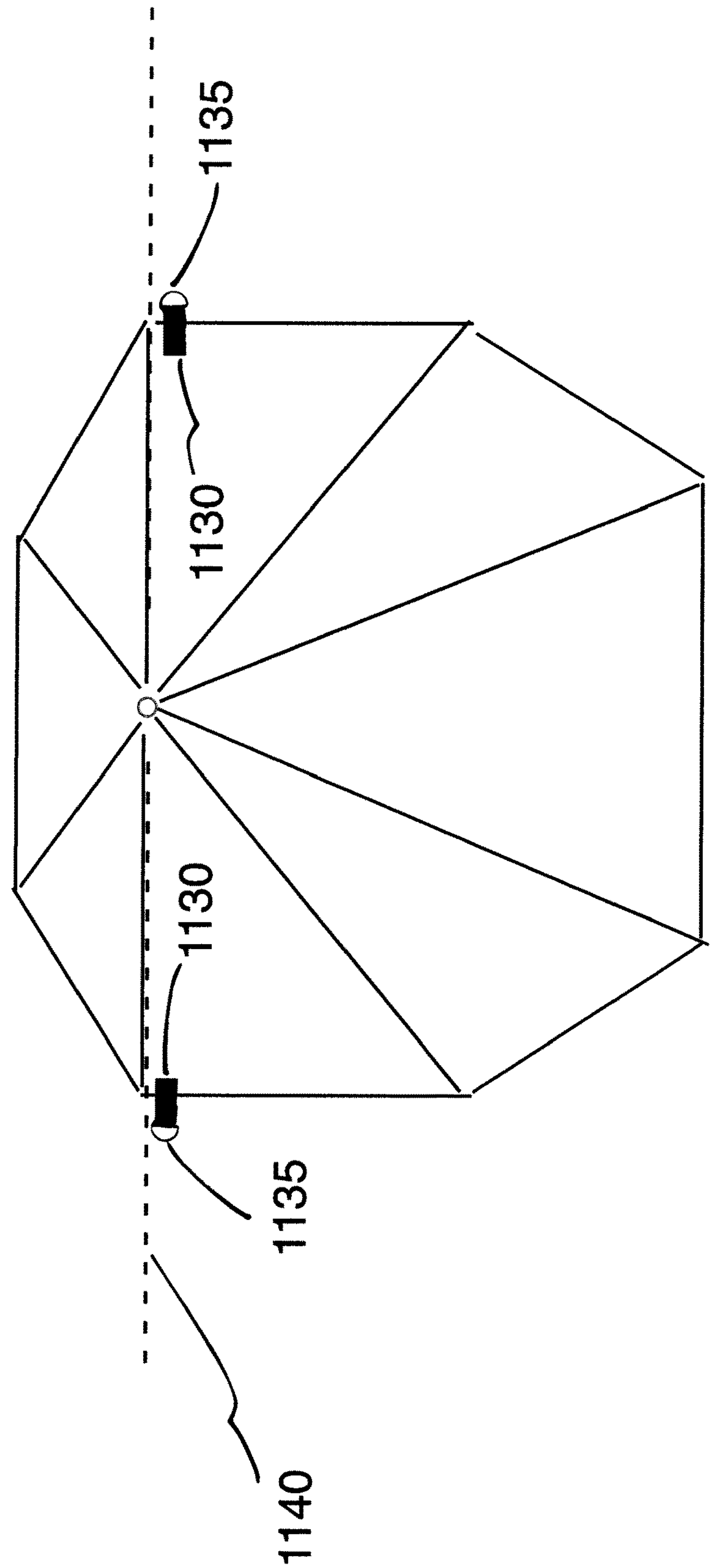
Fig 11-C

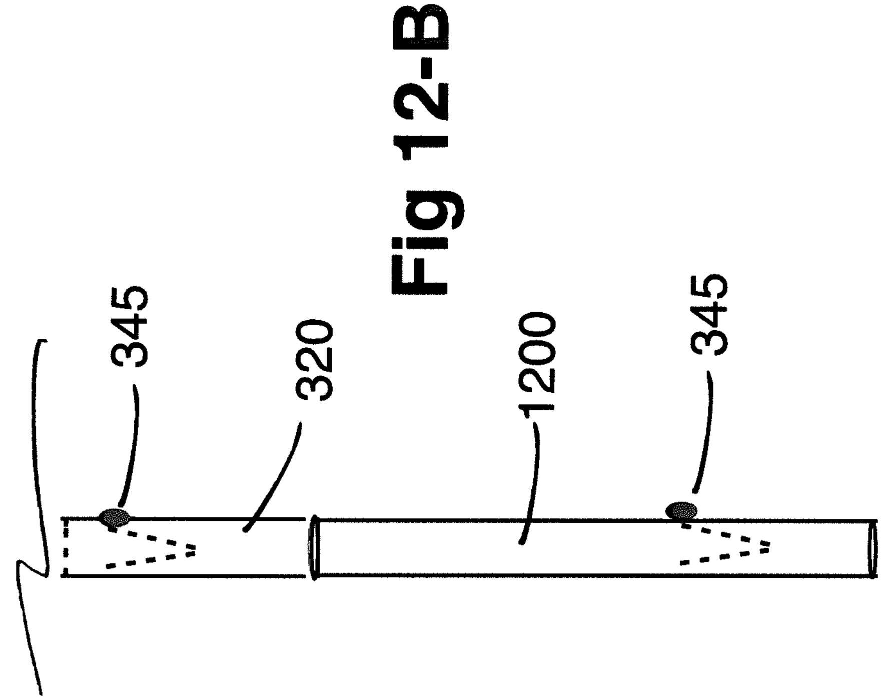
Fig 12-B
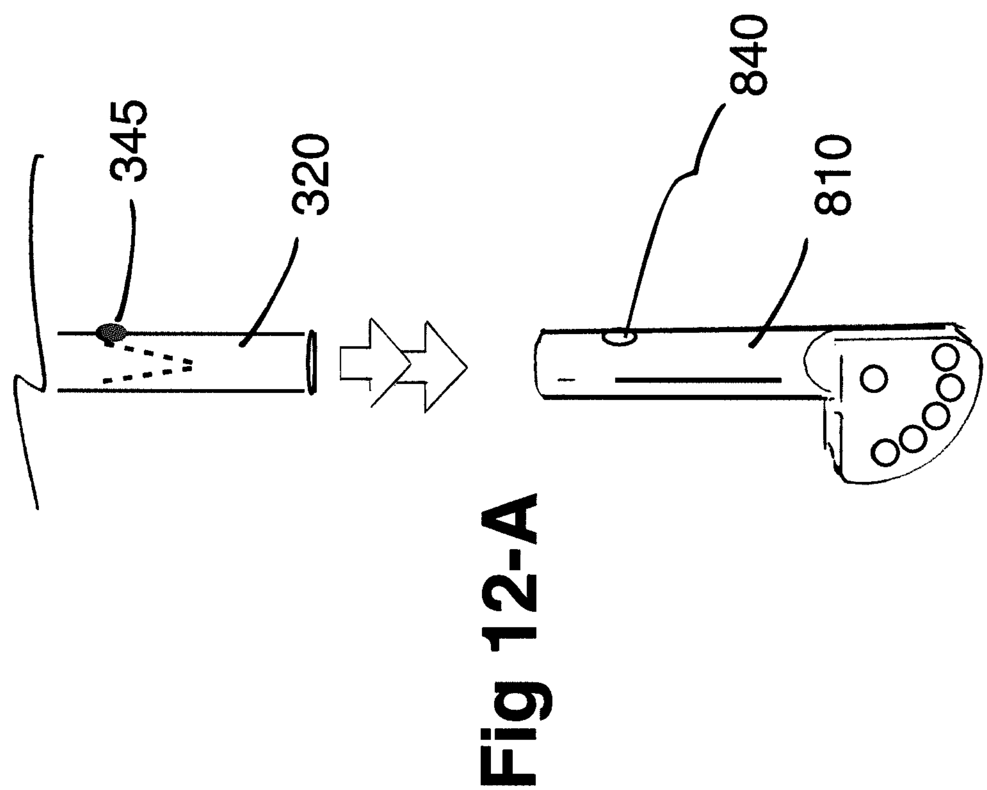
Fig 12-A

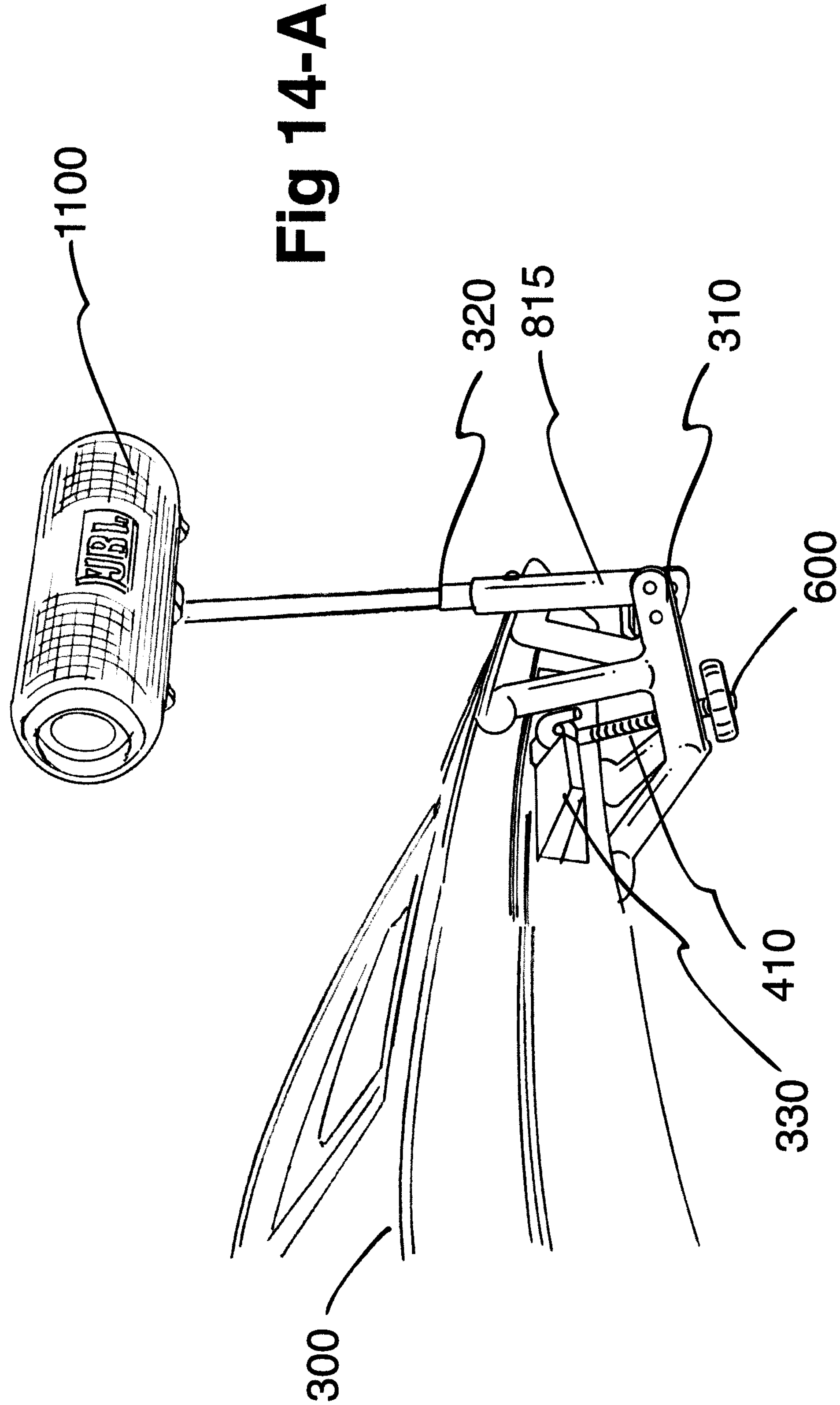
Fig 14-A

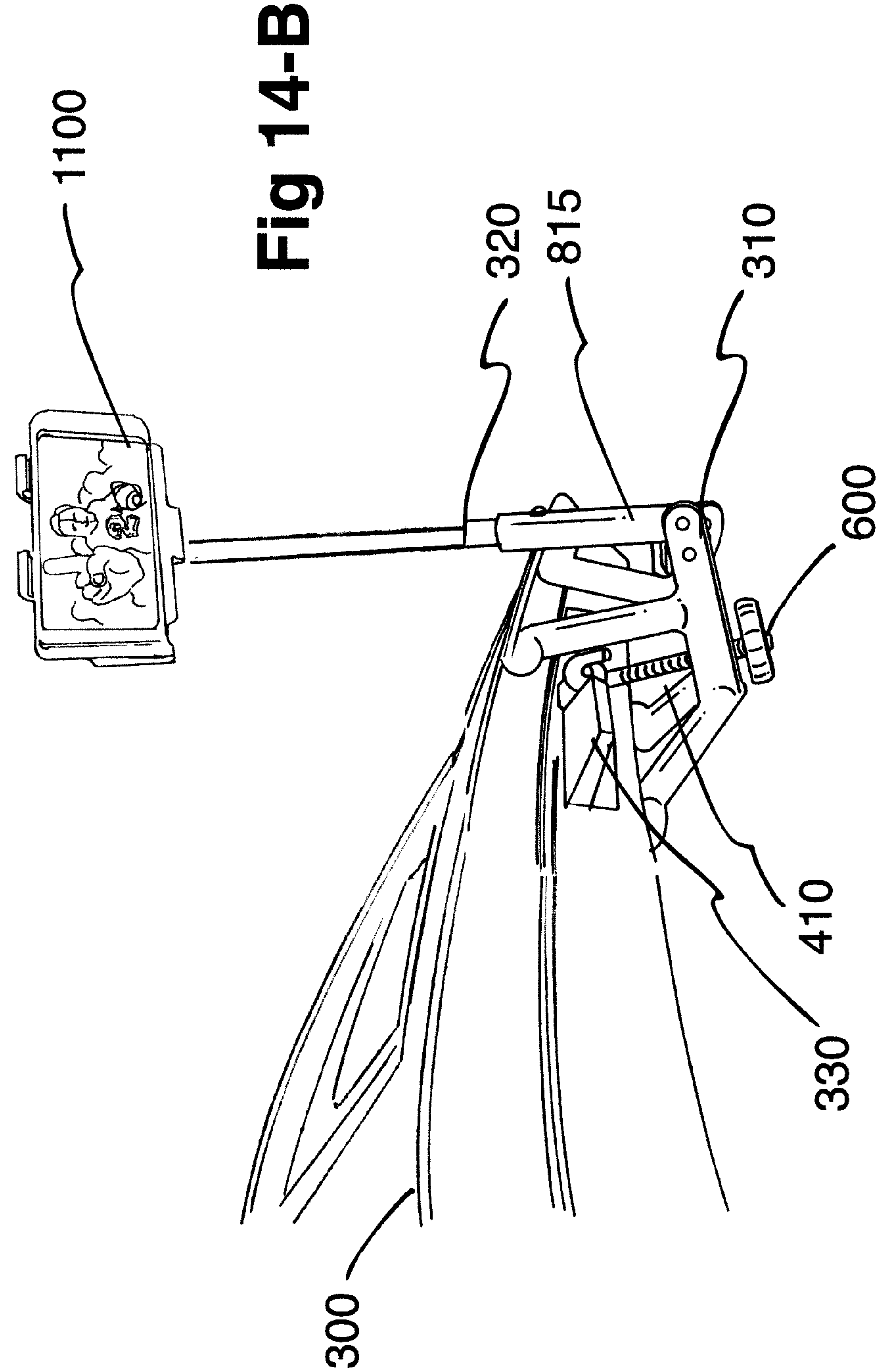
Fig 14-B

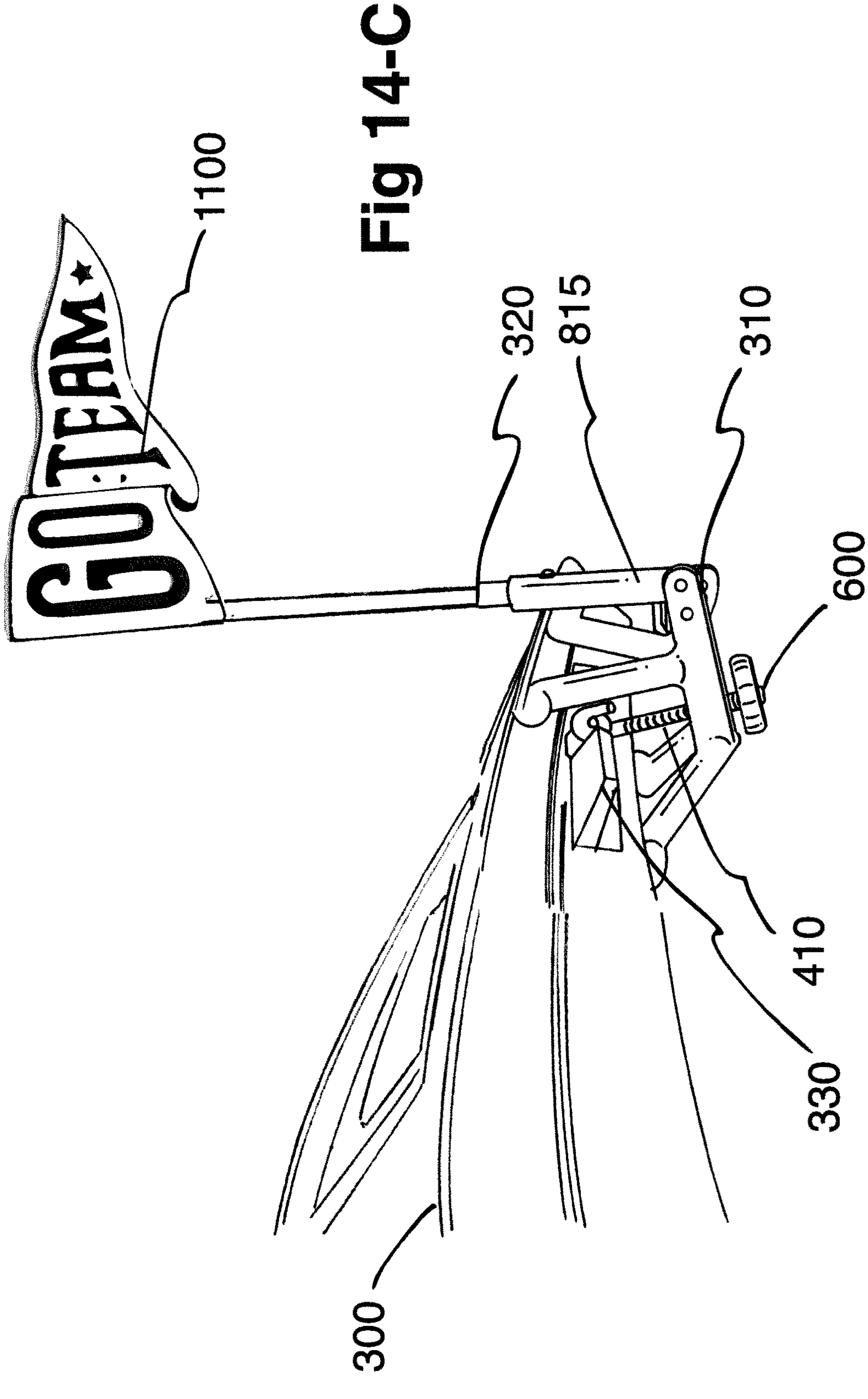
Fig 14-C

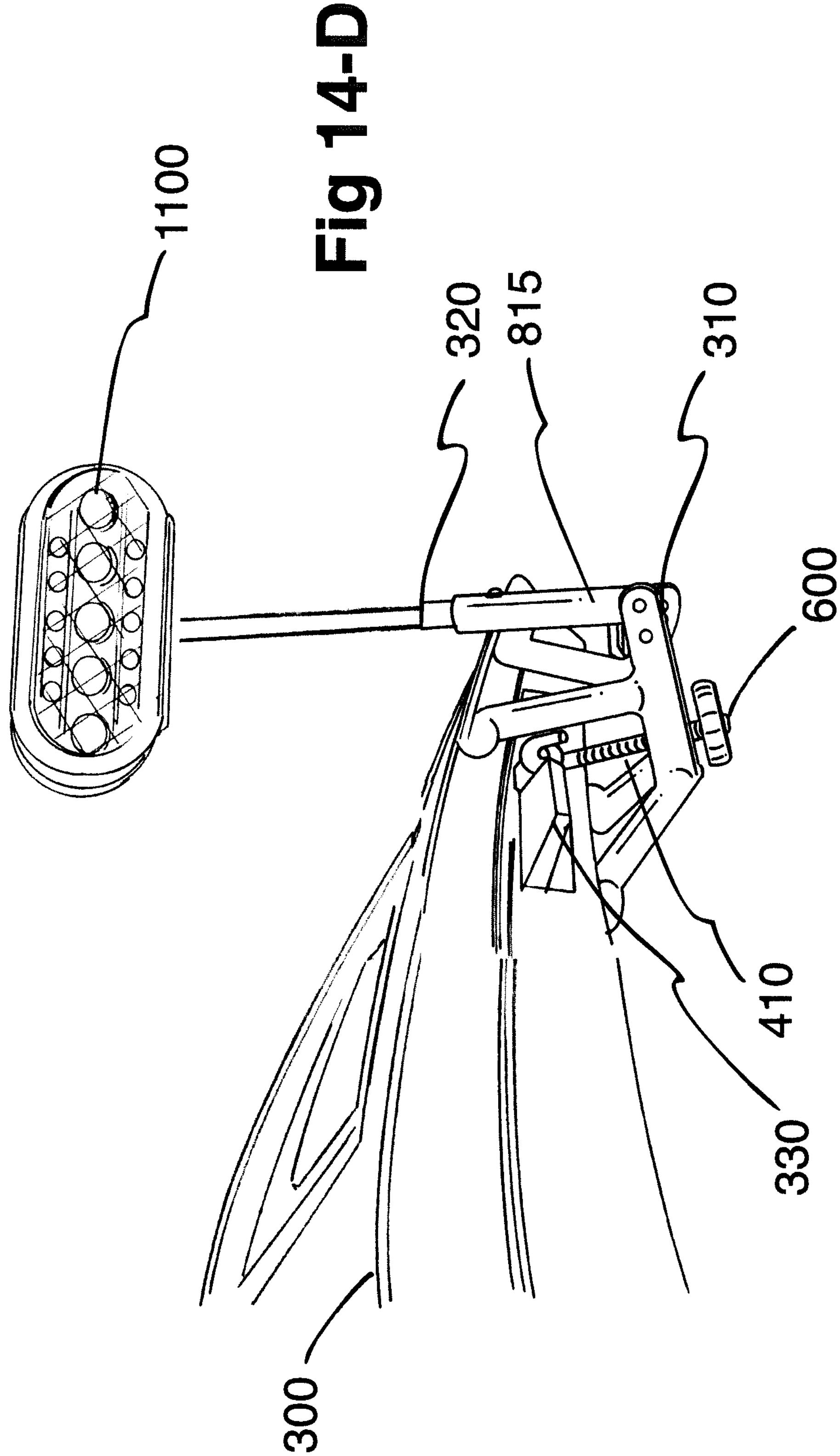
Fig 14-D

VEHICLE LIFT GATE ACCESSORY MOUNTING DEVICE

This claims the benefit of U.S. provisional patent application Ser. No. 62/406,488 filed Oct. 11, 2016, which is incorporated by reference herein in its entirety.

FIELD OF THE INVENTION

The invention relates to the field of supportive devices and, in particular, a support device that utilizes the trunk lid and/or hatch lift gate latch mechanism of a passenger vehicles for accessory attachments such as an umbrella canopy.

BACKGROUND OF THE INVENTION

The trunk lid and/or hatch lift gate of an automobile are a centralized hub for activity in many outdoor pursuits. The most common of which is tailgating, a universal American pastime that uses the vehicle as a base of operations and covers all sports, all seasons and all demographics.

One common issue when participating in these activities is how to keep protected from the elements—both sun and rain. Stand-alone tent products have been developed to satisfy this need but they are large, cumbersome and unwieldy. They take up significant space when stored and need multiple people to assemble and disassemble. Traditional umbrellas require at least one hand to be held, limiting the ability of the user to use two hands for other activities such as loading cargo or holding a plate and a beverage.

It has been observed that the overwhelming majority of all passenger vehicles across makes, models and styles utilize the same or similar trunk latch mechanism to secure the trunk lid or hatch lift gate in place. Cars, vans, SUV's and crossovers come equipped with a latch lift trim ring ("D" ring component) on the base of the trunk or cargo area deck. The engagement of this lift trim ring and the latch mechanism located on the trunk lid or hatch lift gate serves to hold closed the trunk lid or hatch lift gate when not in use.

One object of this invention is to utilize this common latch mechanism to provide an efficient, portable and universal means to attach a variety of accessories to the trunk lid or hatch lift gate to passenger vehicles. Accessory embodiments include, but are not limited to, an umbrella, a flag, an audio speaker, a cell phone, a camera, a heater, a light or a safety flasher to provide protection, pleasure, safety or other benefits to an individual or individuals while standing adjacent to the back of the vehicle.

An additional object of the invention is to provide a device to support various accessories including an umbrella canopy to the latch mechanism of the open trunk or hatch of an automobile where the device is capable of adjustment to fit the appropriate height, distance from, and angle of the trunk lid or hatch.

A further object of the invention is to provide a support, which is capable of adjustment in the position of the accessory relative to the individual as to provide optimum benefit of the accessory such as an umbrella for protection from precipitation or sun intensity.

An additional object of the invention is that an adjustable support be provided which is capable of being mounted or removed without disturbing the original adjustment settings of the bracket.

An additional object of the invention is to utilize the automobile's original factory intended release for the trunk lid or hatch for easy installation and removal of the bracket and accessories.

An additional object of the invention is not to alter or modify in any way the trunk lid or hatch lift gate of a vehicle.

The foregoing and other objectives will become apparent to those skilled in the art through the disclosure following.

SUMMARY OF THE INVENTION

This invention in various embodiments provides a device in the form of a support bracket to be used in conjunction with the automotive vehicle trunk lid and/or hatch lift gate latching mechanism found on most automobiles to hold a variety of accessories above the head of a user including, but not limited to, an umbrella canopy.

Several advantages of one or more aspects of this invention are as follows: to provide a universal bracket compatible with various makes and models of automobile trunk lid and/or hatch lift gates as a means to attach accessory items; to provide a means to engage the bracket with a vehicle's open trunk lid or hatch gate utilizing the existing latching mechanism of the automobile; to provide a means to support an accessory directly above the head of a user when the user is adjacent the open trunk lid or hatch gate of an automobile; to provide a means to accept an incorporated accessory independent of any hand support; to provide a means to customize the angle of an accessory attachment specific to the angle of an individual open trunk lid or hatch gate; to leverage one consistent embodiment of the invention across the commonly used mechanism found on most vehicle make and models; to provide a means to disengage the invention by utilizing one hand through the use of the standard trunk lid or hatch lift gate release/disengagement protocols; and to provide an easy, convenient and portable means to enjoy accessories that enhance the tailgating experience. Other advantages of one or more aspects will be apparent from a consideration of the drawings and ensuing detailed description.

DESCRIPTION OF THE DRAWINGS AND INVENTION

The above-mentioned and other features and advantages of this invention, and the manner of attaining them, will become more apparent and the invention itself will be better understood by reference to the following description of embodiments of the invention taken in conjunction with the accompanying drawings, wherein:

FIGS. 5A-5C are each a detailed view of the engaging and disengaging sequence of the J-hook component of the invention with the existing latch mechanism of a vehicle lift gate;

FIGS. 5D-5F show the typical means by which the vehicle lift gate is activated, disengaging an embodiment of the bracket of this invention;

FIGS. 6A-6C show a perspective view of the bracket with the J-hook and a tensioning knob whereby the tensioning twist knob may be tightened or loosened to secure the bracket against the vehicle lift gate;

FIGS. 11A-11B are each side views of an asymmetrical umbrella canopy accessory embodiment engaged with the accessory sleeve bracket;

FIG. 11C shows a top plan view of the asymmetrical umbrella canopy accessory embodiment;

FIGS. 12A-12B show an accessory shaft embodiment with a spring push button being inserted into the accessory sleeve bracket and the inclusion of an accessory extension shaft that is used to increase the height of the accessory;

Figure 13:
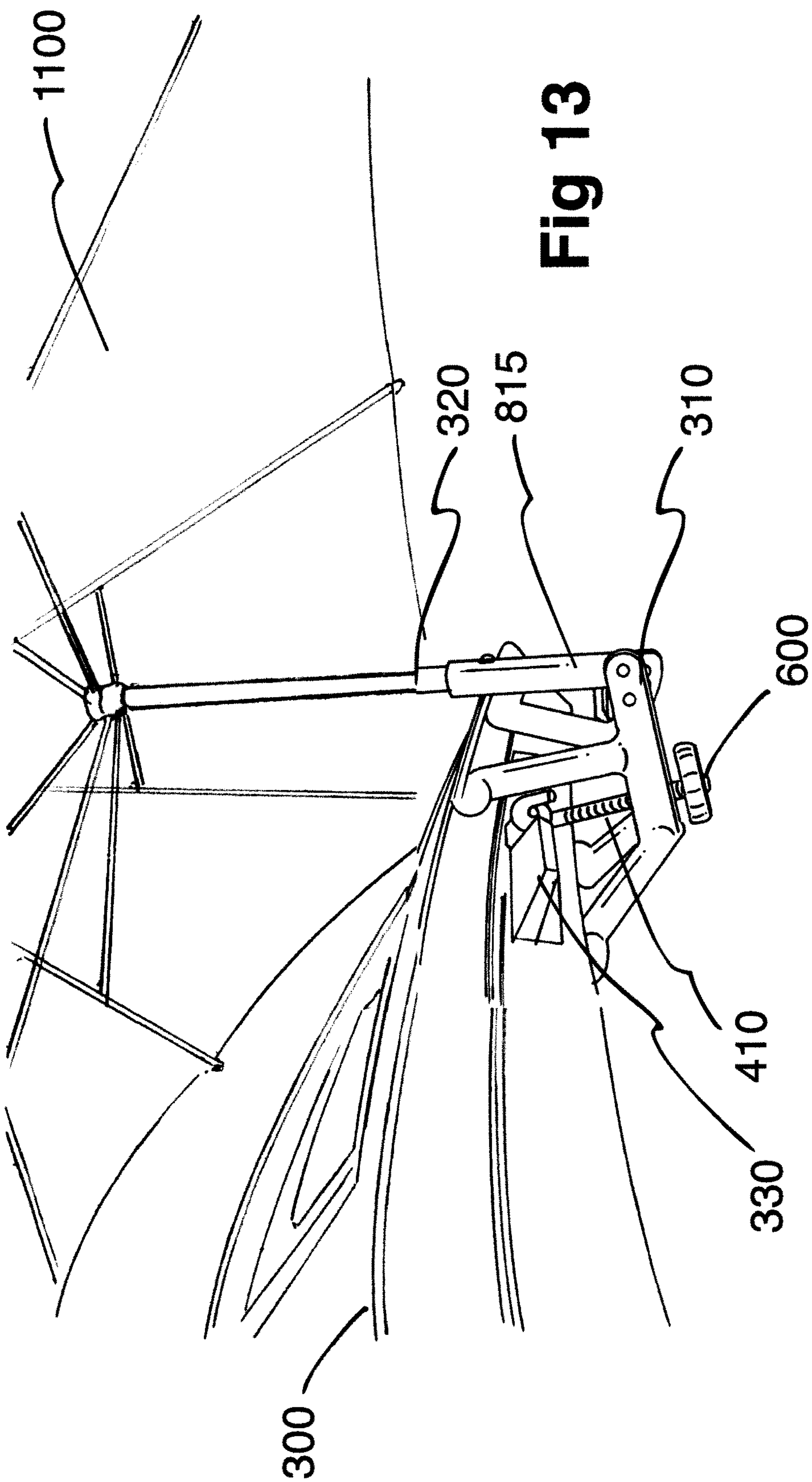

FIG. 13 shows a dimensional view of the full assembly according to one embodiment of this invention with the primary components of the invention engaged with a vehicle lift gate, accommodating an umbrella accessory embodiment; and FIGS. 14A-14D show additional accessory attachment embodiments, including a speaker, mobile phone, team flag and safety light examples, to be used in conjunction with invention.

DRAWINGS—REFERENCE NUMERALS

100 User
300 Vehicle Trunk Lid or Hatch Lift Gate
305 Vehicle
310 Support Bracket
315 Unthreaded Hole
320 Accessory Shaft
325 Hub
330 Vehicle Latch Mechanism
400 Vehicle Latch Internal Locking Ring
410 Threaded J-Hook
415 Threaded Shaft Portion
420 U-Shaped Portion
500 Hatch Release Mechanism
600 Twist Tensioning Knob
700 Support Bracket Body
705 Support Bracket Hub
710 Support Legs
720 Support Bracket Feet
730 Support Bracket Hole
740 Support Bracket Tang
750 Tang Pivot Hole
760 Tang Adjustment Hole
800 Quick Release Pin
810 Accessory Sleeve Bracket
815 Accessory Sleeve
820 Accessory Sleeve Pivot Hole
825 Accessory Sleeve Bearing
830 Accessory Sleeve Adjustment Holes
840 Accessory Sleeve Spring Button Hole
845 Accessory Spring Button
1100 Accessory
1120 Umbrella Canopy Wind Vent
1130 Stabilizing Straps
1135 Stabilizing Rings
1140 Boundary of Lift Gate
1200 Accessory Extension Shaft

DETAILED DESCRIPTION OF THE DRAWINGS AND INVENTION

Figure 1:
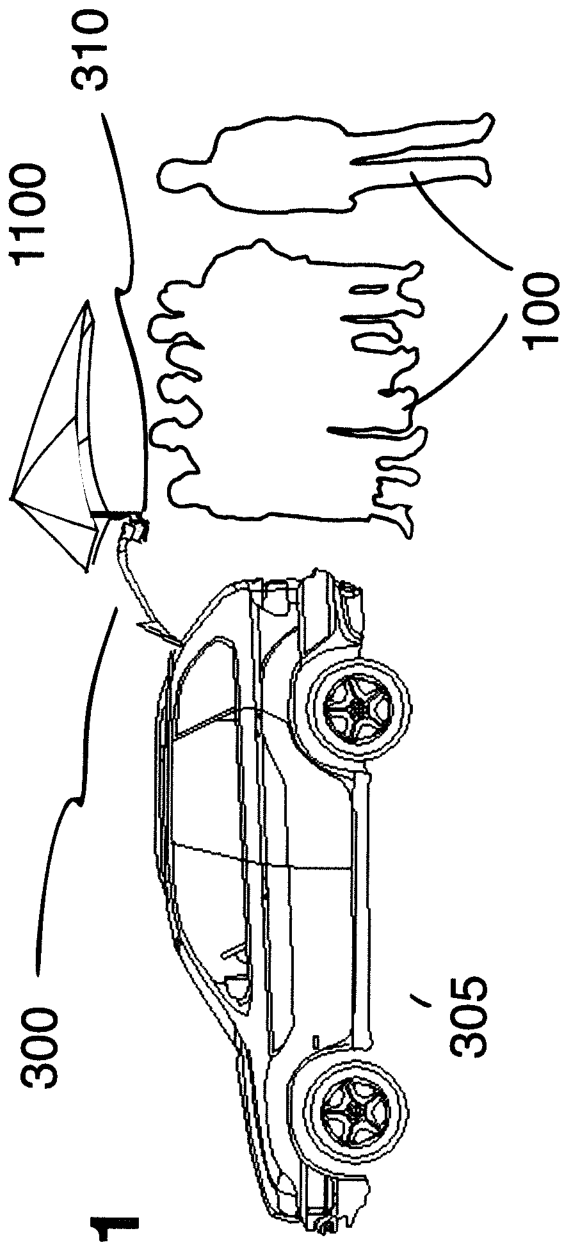
FIG. 1 is a side elevation view of a fully assembled support bracket illustrating one embodiment of this invention with an umbrella canopy attached to a vehicle lift gate.
Figure 2:
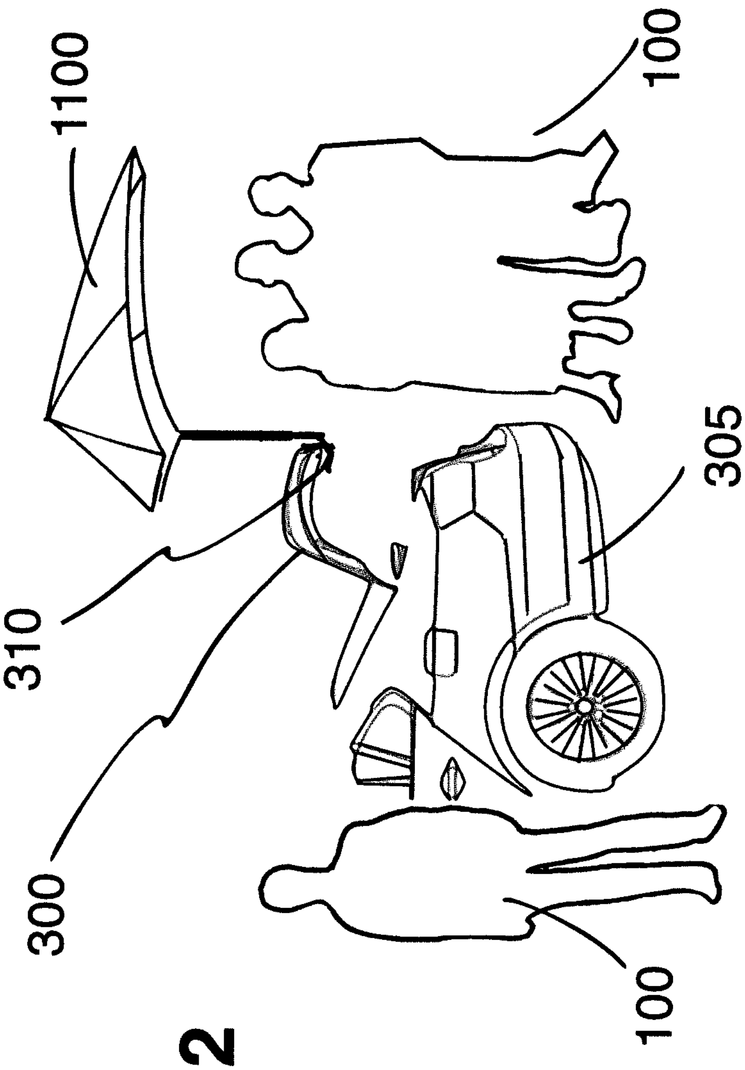
FIG. 2 is a side elevation view of the fully assembled umbrella support bracket in use with the umbrella canopy and an extension arm attached to a vehicle lift gate.

Referring to FIG. 1 and FIG. 2, one embodiment of the invention is shown. The invention can be used universally across the spectrum of automobiles and passenger vehicles including those with a hatch lift gate 300 such as an SUV, a crossover, or a station wagon (FIG. 1) as well as a standard sedan with a rear trunk lid 300 configuration (FIG. 2). The lift gate 300 is movable to and between closed and open positions on a vehicle 305. For the sake of convenience, each of these and other applications of the invention will refer to the vehicle component to which the invention is attached as a "lift gate" herein.

Figure 3:
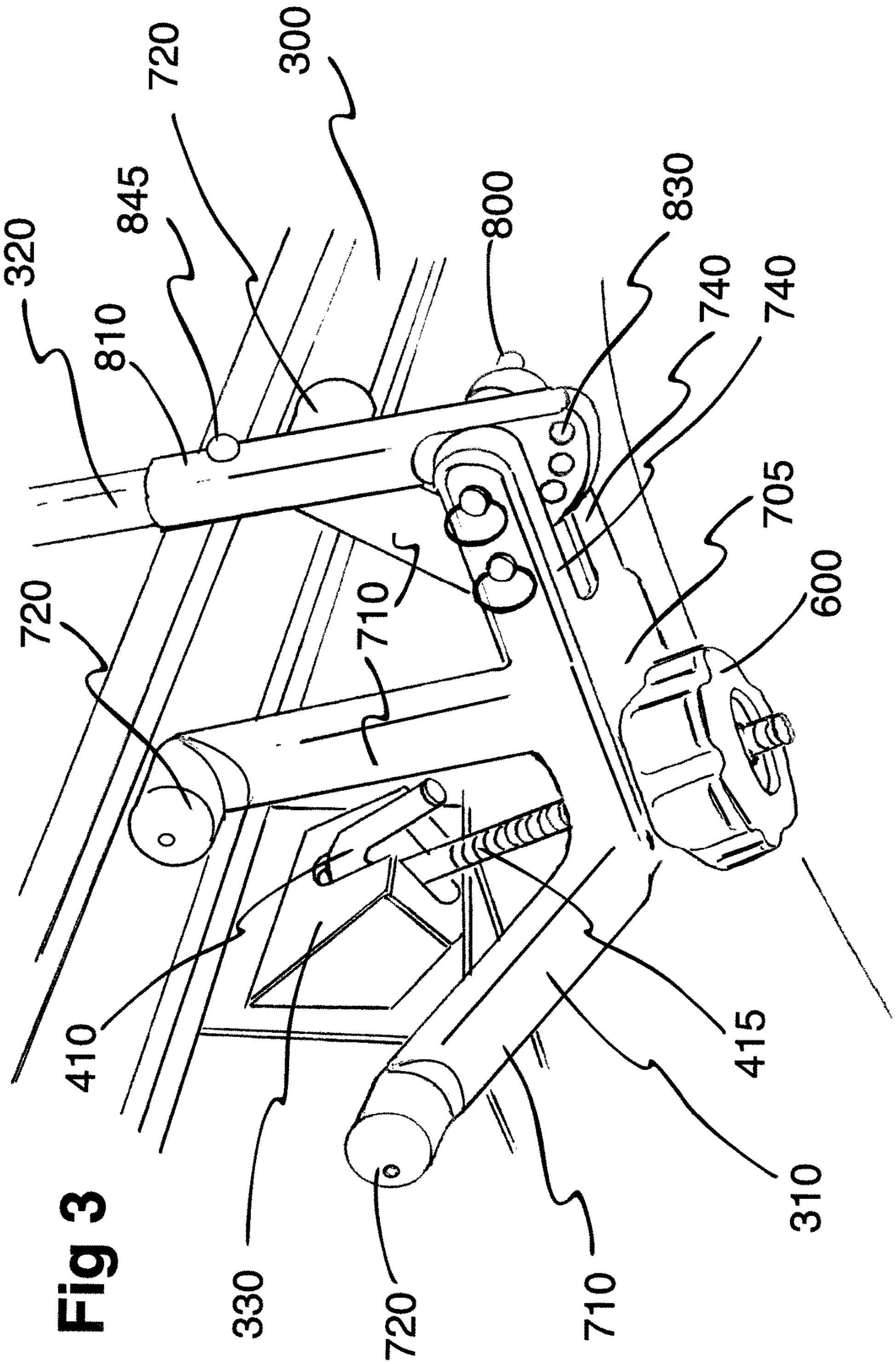
FIG. 3 is perspective view of a complete unit of one embodiment of this invention.
Figure 4:
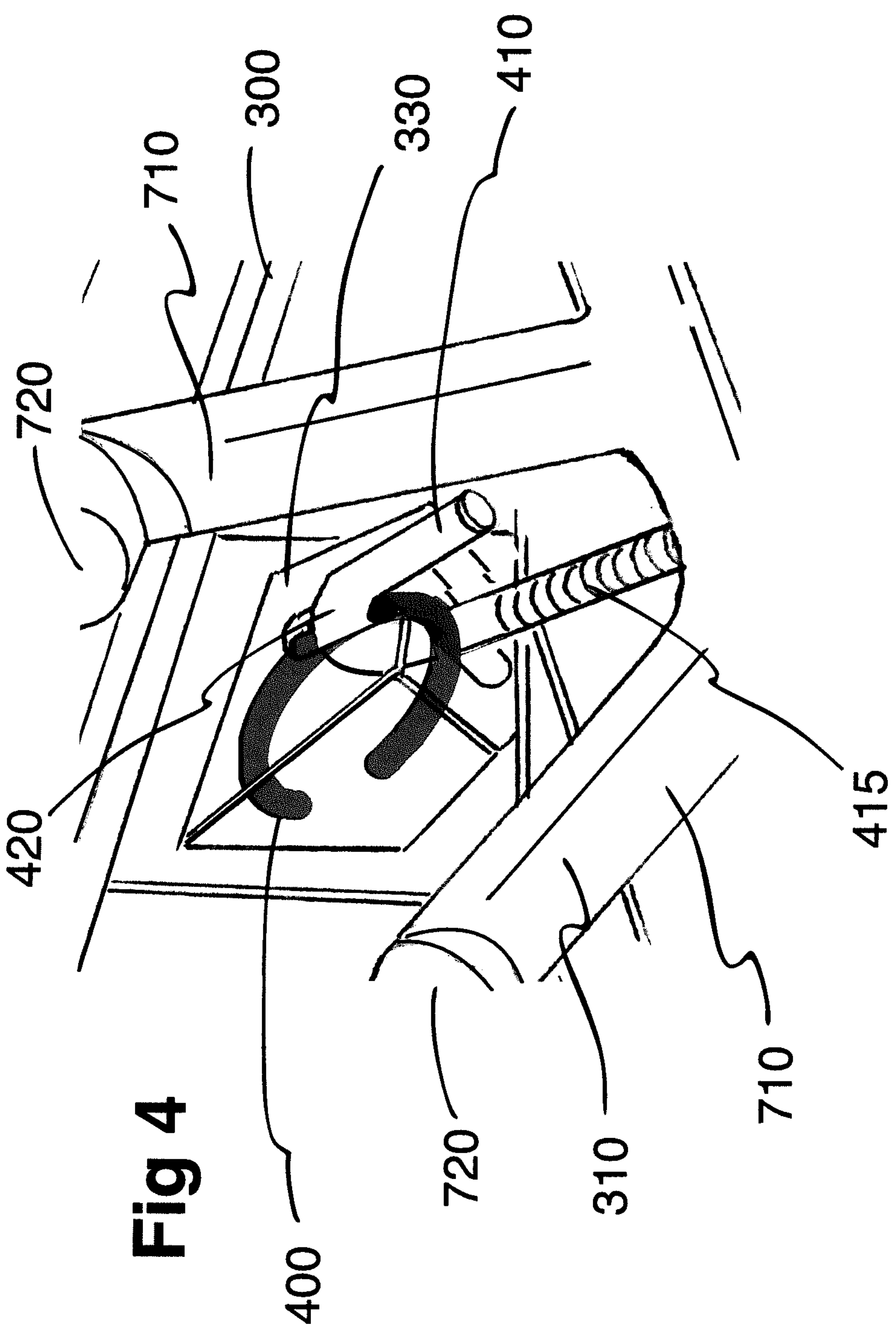
FIG. 4 is a detailed view of one embodiment where a "J-hook" on the bracket is engaged with the existing latch mechanism of a vehicle lift gate.

In various embodiments, the invention includes support bracket 310 (FIG. 3) that is attached to a lift gate 300 of the vehicle 305. The support bracket 310 includes an engagement assembly which in one embodiment includes a threaded member in the form of a J-hook 410 attached to the existing latching mechanism 330 of a vehicle lift gate. A variety of accessory items 110 can then be utilized in conjunction with the bracket 310 (FIG. 3). The support bracket 310 (FIG. 4) is secured to the vehicle's lift gate 300 when a vehicle locking ring 400 is engaged with a U-shaped portion 420 of the threaded J-hook 410. To activate the engagement of the threaded J-hook 410 (FIG. 5A) with the vehicle latch mechanism 330 and locking ring 400, the U-shaped portion 420 of the threaded J-hook 410 is inserted into the latching mechanism 330 found standard on most vehicles 305, thereby activating the rotating trunk/hatch locking ring mechanism 400 found standard on most vehicles 305. When inserted, the ring 400 holds the U-shaped portion 420 of the threaded J-hook 410 securely by rotating around the U-shaped portion 420 of the threaded J-hook 410 of the invention (FIG. 5B).

To remove the support bracket 310 (FIG. 5D), one simply engages the vehicle's standard lift gate release mechanism 500 as they typically would to open their lift gate 300. Examples include the mechanisms 500 found on the exterior of the trunk or hatch, the release button found on the key fob (FIG. 5E) or the release button located on the underside of the lift gate 300 or in the interior of the vehicle 305 (FIG. 5D).

Customized adjustment (FIG. 6A) of the appropriate tightness between the support bracket 310 and the lift gate 300 is achieved by a twist tensioning knob 600 threaded onto a threaded shaft portion 415 of the J-hook 410. The J-hook projects through an unthreaded hole 730 in a hub 325 of the support bracket 310. FIG. 6B shows how turning the twist tensioning knob 600 counter clockwise increases the length of the threaded J-hook shaft 415 above the knob 600 to allow for application on a lift gate 300 that may require more clearance in engagement. FIG. 6C illustrates how the knob 600 may be turned clockwise to shorten the length of the J-hook shaft 415 above the knob 600. This allows for the customized tightening of the support bracket 310 against the lift gate 300 based on the unique configuration requirements of various vehicles 305.

Components of the support bracket 310 (FIG. 7) in various embodiments include the main body frame 700 which includes a mounting arrangement which in one embodiment includes four angled support legs 710 projecting from the hub 325, each with perpendicular main bracket feet 720 which rest directly against the underside of the vehicle lift gate 300. The main body frame 700 includes the unthreaded hole 730 in the middle of the hub 325 that accepts the threaded J-hook shaft 415 (FIG. 6A). Two main bracket tangs 740 extend outward from the hub 325 and are directly positioned away from the vehicle 305 when the support bracket 310 is installed. These two bracket tangs 740 each include both a tang arm pivot hole 750 and a tang arm adjustment hole 760, which cooperate to secure an accessory sleeve bracket 810 shown in FIG. 8B. The two support legs 710*a* adjacent to the bracket tangs 740 are longer and extend further from the hub 325 than the other two support legs 710*b*, in one embodiment of this invention. In particular, in one embodiment the distal ends of the two support legs 710*a* adjacent to the support tangs 740 are spaced 10.75 inches apart and are each 6.25 inches in length. The distal ends of the other two support legs 710*b* are 9.25 inches apart and each of those legs 710*b* is 5.0 inches long. Each support tang 740 is 3.5 inches long and the hub 325 is 3.25 inches wide in one embodiment. Each bracket foot 720 extending from one of the support legs 710 is 1.5 inches long in one embodiment. In various embodiments, the support bracket 310 may be aluminum, fiberglass infused nylon, plastic or another material appropriate for the desired manufacturing and performance characteristics.

Figure 8:
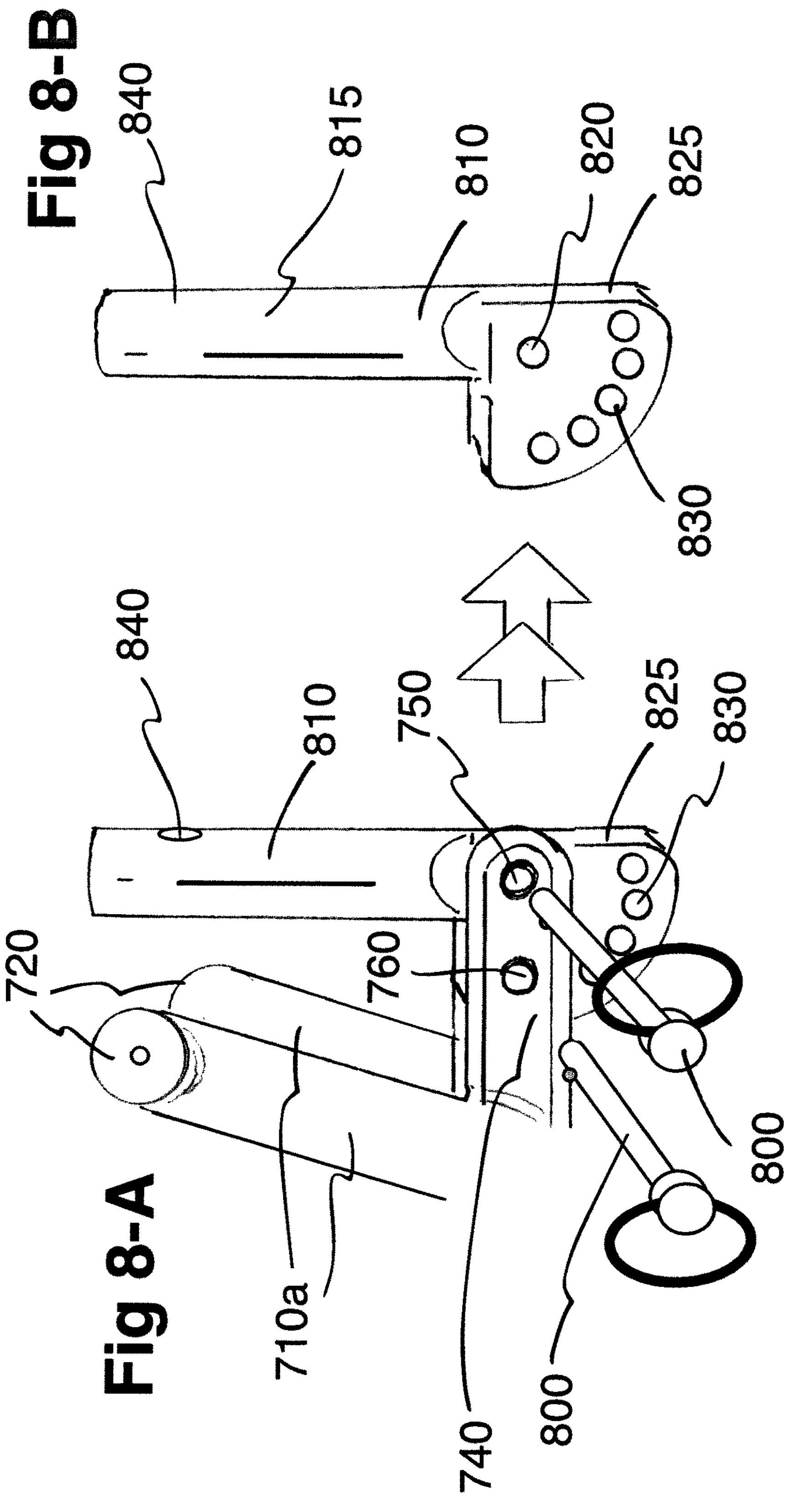
FIGS. 8A-8B show a pair of quick release pins used to secure the accessory sleeve bracket in place.

The accessory 1100 to be supported by the bracket 310 may be coupled to the bracket 310 by an accessory mounting assembly which in one embodiment includes an accessory sleeve 815 (FIG. 8B) which accommodates a variety of accessory components in conjunction with the support bracket 310. Quick release pins 800 illustrated in FIG. 8A are inserted into each of the accessory sleeve pivot hole 820 and the accessory sleeve adjustment hole 830 of an accessory sleeve bearing 825 and are used to securely hold the accessory sleeve bracket 810 to the tangs 740 and provide for a convenient means to assemble and disassemble the components. An accessory spring button hole 840 is located on the outward side of the accessory sleeve 815, which can receive a spring-loaded push button 845 on the shaft 320 of an accessory 1100 for a secure hold.

Figure 9:
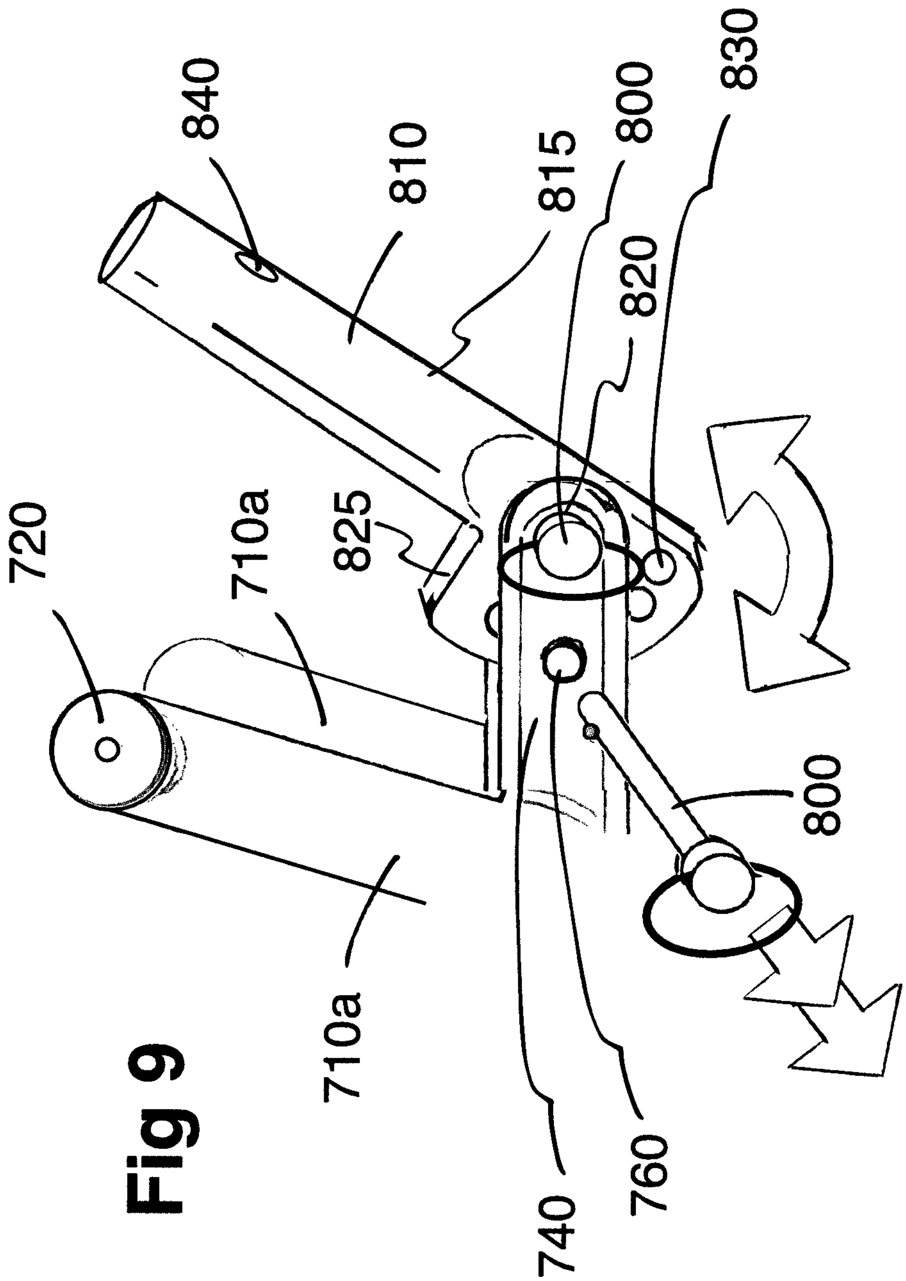
FIG. 9 is a detailed view of how the accessory sleeve bracket may be adjusted for a customized angle of the accessory sleeve bracket relative to the support bracket.

As shown in FIG. 9, an accessory sleeve pivot hole 820 serves as a centralized fulcrum for the accessory sleeve bracket 810 to be angularly adjusted by selecting the most appropriate adjustment hole 830 for the appropriate angular orientation of the accessory 1100.

Figure 10:
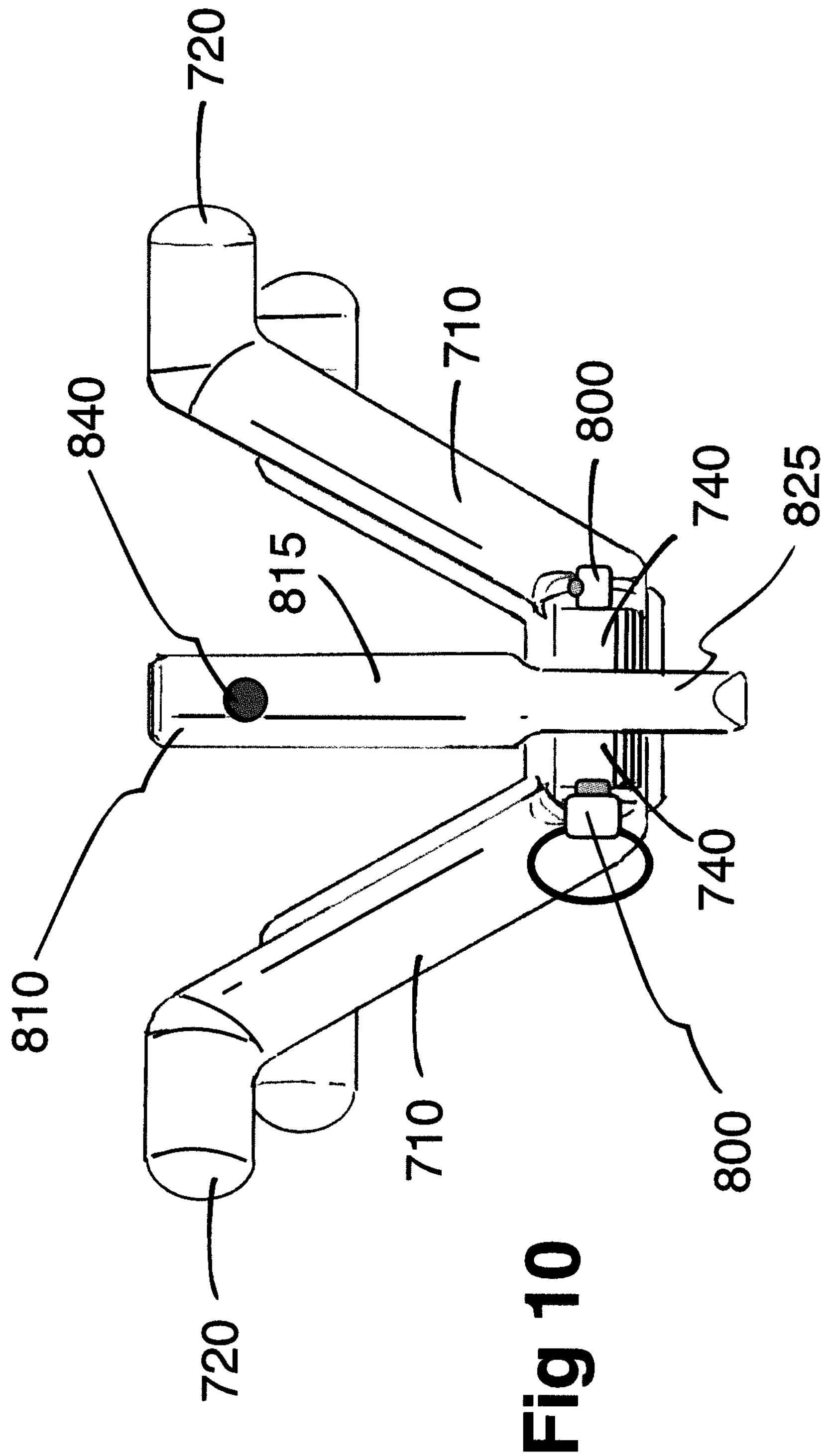
FIG. 10 is a front elevation view of both the bracket and the accessory sleeve bracket secured in place by quick release pins.

As shown in FIG. 10, when in use, the accessory sleeve bracket 810 with the incorporated accessory spring button hole 840 is nested between the two main bracket tangs 740 attached to the support bracket 310. Both are secured together by the quick release pins 800 that are inserted through the tang arm pivot holes 750, the accessory sleeve pivot hole 820 and the accessory sleeve adjustment hole 830.

As shown in FIGS. 11A-11C, an offset umbrella canopy 1100 represents one accessory for the invention. FIG. 11A shows an elevation view of the umbrella canopy 1100 when inserted into the support bracket 310. The shaft 320 of the umbrella 1100 is inserted into the accessory sleeve bracket 810, held in place by a spring push button 845 located on the shaft 320 of an accessory 1100 and protruding through the accessory sleeve adjustment hole 830 incorporated into the accessory sleeve bracket 810.

Figure 7:
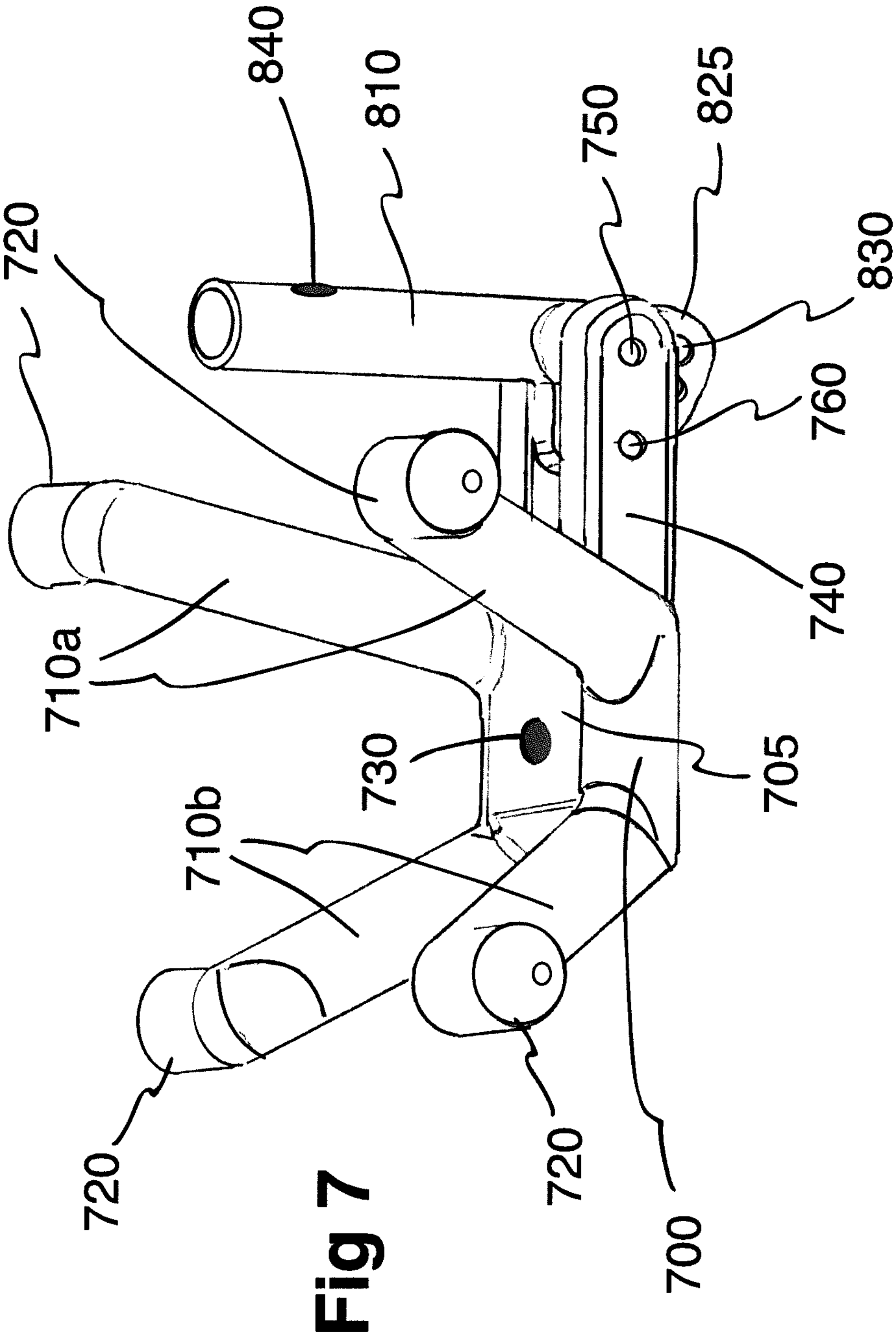
FIG. 7 is a perspective view of the bracket with an accessory sleeve bracket in place.

The umbrella canopy accessory 1100 (FIG. 11B) includes elements such as wind vents 1120 on top of the canopy 1120 as well as stabilizing rings 1130 that may accommodate tie-down strapping around the vehicle's lift gate 300. These elements serve to alleviate excessive pressure on the canopy 1100 during windy conditions and guard against unwanted torque on the support bracket 310 (FIG. 7).

FIG. 11C is a plan view of the offset umbrella canopy 1100 to illustrate the overall configuration, which will extend well beyond the rear perimeter boundary 1140 of an open lift gate 300 for maximum coverage of the user 100 from sun or rain.

Referring to FIGS. 12A and 12B, the accessory sleeve bracket 810 allows for the insertion and removal of the umbrella canopy or other accessory shaft 320 by depressing the spring button 845 while sliding the shaft 320 vertically in or out of the accessory sleeve bracket 810. The accessory shaft 320 may utilize a telescoping accessory extension shaft 1200 shown in FIG. 12B to adjust the height of the accessory 1100 custom to the height of the user's vehicle open lift gate 300.

FIG. 13 shows a fully integrated support bracket 310 with an umbrella canopy accessory 1100 attached to the lift gate 300.

FIG. 14A-14D show various accessory components 1100 of the overall invention which may include a blue-tooth audio speaker (FIG. 14A), a cell phone or camera (FIG. 14B), a team or promotional flag (FIG. 14C), a flashing safety light (FIG. 14D), or other accessory components 1100 beneficial for use in conjunction with a vehicle lift gate 300.

From the description above, a number of advantages of some embodiments of this invention become evident, including:

(a) The invention utilizes the existing trunk lid or hatch lift gate locking mechanism found standard across vehicle makes and models.
(b) It utilizes one common design configuration for maximum flexibility in application to traditional sedans as well as SUV's, station wagons, vans and crossovers.
(c) It provides a flexible platform to accommodate a wide variety of accessory items that may enhance the outdoor experience of tailgating or use of rear storage compartments when loading or unloading of vehicles.
(d) By virtue of the simple, twist knob adjustment configuration, the bracket can be rapidly tightened or loosened with one single action for maximum stability of the platform when in use.
(e) It allows for a single person installation, providing convenience for an independent user.
(f) The sleeve bracket is adjustable in angle to accommodate a variety of open trunk lids or hatch lift gate orientations, allowing for customization to the desired orientation of the accessories when in place.
(g) By utilizing the existing factory trunk lid or vehicle hatch lift gate release mechanisms; the invention is easily detached by initiating the standard release technique including the lift latch located on the trunk or hatch, the OEM supplied key fob or any of the push button releases already incorporated into the vehicle.
(h) The configuration allows for one-hand disassembly.
(i) Once the invention is installed to the appropriate tension, no further adjustments are needed for subsequent uses with that vehicle.
(j) By utilizing the existing trunk or hatch gate locking mechanism, the entire invention is located overhead of the user, providing for total freedom of movement by persons underneath the open lid/hatch and allows unobstructed accessibility to the rear storage compartments of vehicles.
(k) The temporary use and portable design does not require any alteration to the vehicle itself.
(l) The small, compact size allows for convenient storage within the trunk or hatch compartment of a vehicle when not in use and may be easily transferred to different vehicles whenever desired.

(m) The cylindrical, horizontal bracket feet located at the ends of the bracket angle arms provide for an effective means of dispersing the weight and pressure of the bracket against the trunk lid or lift gate when using an accessory.

Accordingly, this invention in various embodiments provides an easy, convenient, portable and universally applicable means to attach accessories to the open trunk lid or hatch lift gates of standard passenger vehicles. This invention will serve to enhance the overall user experience when tailgating or otherwise using the rear trunk or storage compartments of one's vehicle. The benefits of such a device serves to accommodate accessories such as an umbrella canopy that provides protection of the user from the outdoor elements or in the case of a wide variety of additional accessories, that otherwise provide experiential benefits when enjoying outdoor activities associated with one's vehicle.

Furthermore, the device has additional advantages in that:

it is applicable across a broad spectrum of passenger vehicles;

it requires no alteration to one's vehicle;

it can be attached or detached by a single person, not requiring assistance from others;

it can be custom fit by use of a single twist knob to tighten according to the individual vehicle lock mechanism-housing configuration/geometry;

it can accommodate a variety of accessory items that enrich the outdoor experience using an automobile;

it's can be adjusted for a customized angle of orientation of the accessory attachment;

it can be released using the standard release protocol provided by the automobile manufacturer;

it can allow for the incorporation of an umbrella canopy for protection of a user from outdoor elements such as sun or rain;

it can accommodate a wide variety of entertainment and/or safety accessories to enhance the outdoor experience;

it can be conveniently stored within a trunk or hatch cargo compartment with minimal space requirements;

it can be easily transferred to a variety of automotive vehicles given its universal platform application.

Although the description above contains many specificities, these should not be construed as limiting the scope of the embodiments but as merely providing illustrations of some of the several embodiments. For example, the main bracket assembly can have other shapes, such as circular, oval, trapezoidal, triangular, etc.; the accessory sleeve bracket can have other shapes and means of connection to the main bracket assembly. And the sun or rain protection accessory may have multiple manifestations such as a tent canopy rather than an umbrella design.

Thus, the scope of the embodiments should be determined by the appended claims and their legal equivalents, rather than by the examples given.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

I claim:

1. A combination comprising:

a vehicle;

a lift gate on the vehicle movable between a closed and an open upward position;

a latch mechanism on the lift gate adapted to secure the lift gate to the vehicle in the closed position;

a support bracket having a mounting arrangement for securely mounting the support bracket against the vehicle lift gate proximate the latch mechanism when the lift gate is in the open position;

an engagement assembly coupled to the support bracket and engaged and retained by the latch mechanism to thereby releasably attach the support bracket to the vehicle lift gate;

an accessory; and an accessory mounting assembly for selectively coupling the accessory to the support bracket for use relative to the vehicle proximate the lift gate in the open position;

wherein the engagement assembly is adjustable relative to the support bracket to provide for secure mounting of the support bracket relative to the vehicle lift gate and a threaded member is received within a hole in the support bracket to thereby provide for adjustability of the engagement assembly relative to the support bracket.

2. The assembly of claim 1 wherein the accessory has a shaft, the accessory mounting assembly further comprising:

an accessory sleeve into which an end of the shaft of the accessory is received.

3. The assembly of claim 2 wherein angular orientation of the sleeve relative to the support bracket is adjustable.

4. The assembly of claim 1 wherein the mounting arrangement further comprises:

a plurality of support legs projecting from the support bracket to be positioned against the open vehicle lift gate for stable mounting of the support bracket relative to the open vehicle lift gate.

5. The assembly of claim 1 wherein the engagement assembly further comprises:

a knob threadably mounted on the threaded member for positioning the threaded member relative to the support bracket.

6. The combination of claim 1 wherein the engagement assembly further comprises:

a U-shaped member extending from the support bracket adapted to be engaged by the lift gate latch mechanism.

7. The combination of claim 1 wherein the accessory is one of an umbrella, an audio speaker, a light, a banner, and a video display device.

8. A combination comprising:

a vehicle;

a lift gate on the vehicle movable between a closed and an open upward position;

a latch mechanism on the lift gate adapted to secure the lift gate to the vehicle in the closed position;

a support bracket having a mounting arrangement for securely mounting the support bracket against the vehicle lift gate when in the open position proximate the latch mechanism;

wherein the mounting arrangement further comprises a plurality of support legs projecting from the support bracket to be positioned against the vehicle lift gate for stable mounting of the support bracket relative to the lift gate;

an engagement assembly coupled to the support bracket and adapted to be engaged and retained by the latch mechanism to thereby releasably attach the support bracket to the vehicle lift gate;

wherein the engagement assembly is adjustable relative to the support bracket to provide for secure mounting of the support bracket relative to the vehicle lift gate;

wherein the engagement assembly further comprises a threaded member received within a hole in the support bracket to thereby provide for adjustability of the engagement assembly relative to the support bracket and a clevis extending from the support bracket adapted to be engaged by the lift gate latch mechanism;

a knob threadably mounted on the threaded member for positioning the threaded member relative to the support bracket; and an accessory mounting assembly for selectively coupling an accessory to the support bracket for use relative to the vehicle proximate the lift gate, the accessory mounting assembly including a sleeve into which an end of a shaft of the accessory is received;

wherein angular orientation of the sleeve relative to the support bracket is adjustable.

9. The assembly of claim 8 wherein the engagement assembly further comprises:

a U-shaped member extending from the support bracket adapted to be engaged by the vehicle lift gate latch mechanism.

10. The assembly of claim 8 wherein the accessory is one of an umbrella, an audio speaker, a light, a banner, and a video display device.

* * * * *